US012522855B2

(12) United States Patent
Orion et al.

(10) Patent No.: US 12,522,855 B2
(45) Date of Patent: Jan. 13, 2026

(54) METHODS AND KITS FOR IDENTIFYING THROMBUS ORIGIN AND OPTIMIZING POST-ISCHEMIC EVENT TREATMENT

(71) Applicant: TEL HASHOMER MEDICAL RESEARCH INFRASTRUCTURE AND SERVICES LTD., Ramat Gan (IL)

(72) Inventors: David Orion, Kiryat Ono (IL); Zeev Itsekson-Hayosh, Tel Aviv-Yaffo (IL); Efrat Shavit-Stein, Pardes Hanna-Karkur (IL); Joab Chapman, Kiriat Ono (IL)

(73) Assignee: TEL HASHOMER MEDICAL RESEARCH INFRASTRUCTURE AND SERVICES LTD., Ramat Gan (IL)

( * ) Notice: Subject to any disclaimer, the term of this patent is extended or adjusted under 35 U.S.C. 154(b) by 941 days.

(21) Appl. No.: 17/631,162

(22) PCT Filed: Jul. 23, 2020

(86) PCT No.: PCT/IL2020/050816
§ 371 (c)(1),
(2) Date: Jan. 28, 2022

(87) PCT Pub. No.: WO2021/019529
PCT Pub. Date: Feb. 4, 2021

(65) Prior Publication Data
US 2022/0298539 A1    Sep. 22, 2022

Related U.S. Application Data

(60) Provisional application No. 62/880,681, filed on Jul. 31, 2019.

(51) Int. Cl.
*C12Q 1/56* (2006.01)
(52) U.S. Cl.
CPC ......... *C12Q 1/56* (2013.01); *G01N 2333/974* (2013.01); *G01N 2800/226* (2013.01)
(58) Field of Classification Search
CPC .............. C12Q 1/56; G01N 2333/974; G01N 2800/226
See application file for complete search history.

(56) References Cited

U.S. PATENT DOCUMENTS 4,458,015 A     7/1984  Jering et al.
2009/0311730 A1  12/2009  Hemker et al.

FOREIGN PATENT DOCUMENTS

EP    0420332    4/1995
WO    03093831   11/2003

OTHER PUBLICATIONS

Xin et al., "Interconnectedness of global hemostasis assay parameters in simultaneously evaluated thrombin generation, fibrin generation and clot lysis in normal plasma." Thrombosis Research. 14: 132-139. (Year: 2016).*
Palmerini et al., "Detection of Tissue Factor Antigen and Coagulation Activity in Coronary Artery Thrombi Isolated from Patients with ST-Segment Elevation Acute Myocardial Infarction," PLoS One. 8:12 (Year: 2013).*
Negreva et al., "Decreased Activity of the Protein C Anticoagulant Pathway in the Early Hours of Paroxysmal Atrial Fibrillation," Clinical and Applied Thrombosis/Hemostasis. 23(7): 793-799. (Year: 2017).*
Steinberg and Piccini, "Anticoagulation in atrial fibrillation." BMJ. 1-10 (Year: 2014).*
Angilillo et al., "Platelet thrombin receptor antagonism and atherothrombosis." Eurpoean Heart Journal. 31: 17-28 (Year: 2010).*
Bushi et al (2013) Quantitative detection of thrombin activity in an ischemic stroke modal, J Mol Neurosci, 31 (3):844-850. DOI 10.1007/s12031-013-0072-y.
Reuveni et al (2017) Measuring thrombin activity in frozen brain tissue, Neuroreport, 28(7):1176-1179. DOI: 10.1097/WNR.0000000000000902.
Duffy et al (2017) Novel methodology to replicate clot analogs with diverse composition in acute ischemic stroke, J Neurointerv Surg, Published Online First: 2017, doi:10.1136/neurintsurg-2016-012308.
Beilin et al (2001) Quantitative measurements of mouse brain thrombin-like and thrombin inhibition activities, Neuroreport, 12(11):2347-2351. doi: 10.1097/00001756-200108080-00013.
Chapman J (2013) Coagulation in inflammatory diseases of the central nervous system. Semin Thromb Hemost Published Online First: 2013. doi:10.1055/s-0033-1357482.
Tsekson-Hayosh et al (2015) Thrombin Activity and Thrombin Receptor in Rat Glioblastoma Model: Possible Markers and Targets for Intervention? J Mol Neurosci, 56:644-651. DOI 10.1007/s12031-015-0512-y.
PCT International Search Report for International Application No. PCT/IL2020/050816, mailed Nov. 9, 2020, 5pp.
PCT Written Opinion for International Application No. PCT/IL2020/050816, mailed Nov. 9, 2020, 7pp.
PCT International Preliminary Report on Patentability for International Application No. PCT/IL2020/050816, completed Feb. 1, 2022, 8pp.
Francis et al (1983) Thrombin activity of fibrin thrombi and soluble plasmic derivatives, Journal of Laboratory and Clinical Medicine, 102(2):220-230.

(Continued)

*Primary Examiner* — Suzanne M Noakes
*Assistant Examiner* — Ciara A McKnight
(74) *Attorney, Agent, or Firm* — The Roy Gross Law Firm, LLC; Roy D. Gross

(57) ABSTRACT

Provided herein are method and kits for identifying thrombus origin based on temporal thrombin activity assay, and use thereof for optimizing post-ischemic event treatment, and further preventing recurrence of secondary ischemic events.

9 Claims, 17 Drawing Sheets

(56) References Cited

OTHER PUBLICATIONS

Bushi et al (2016) A novel histochemical method for the visualization of thrombin activity in the nervous system, Neuroscience, vol. 320, pp. 93-104.

Sporns et al (2017) Ischemic Stroke: What Does the Histological Composition Tell US About the Origin of the Thrombus?, 48(8):2206-2210.

* cited by examiner

Table 1A. AF clots

| # | Age | Smoker | Diabetes | HTN | Dysl | PVD | IHD | CHF | AF | Occluded Vessel | Onset to Thrombus time (Hrs) | IV tPA bridging | Current Antithrombotic Treat | INR or NOAC levels (ng/ml) | Susp. Etiology | Thrombin activity decay (7th-1st hr ratio) | Decay Slope | p |
|---|---|---|---|---|---|---|---|---|---|---|---|---|---|---|---|---|---|---|
| 1 | 70s | N | N | N | Y | N | Y | N | Y | RMCA | 8 | No | Dabigatran 110 mg td, stopped for 2 days | NA | AF | | | |
| 2 | 70s | N | N | Y | Y | N | N | N | N | LACA | 6 | No | Aspirin | NA | AF, new | 0.3 | -0.28 | 0.07 |
| 3 | 70s | N | Y | Y | Y | N | N | N | N | LMCA | 3.5 | No | Aspirin, Plavix | NA | AF, new | 0.2 | -0.40 | 0.01 |
| 4 | 80s | N | Y | Y | Y | N | N | N | Y | LMCA | Wake up stroke | No | Aspirin | NA | AF | 0.4 | -0.04 | 0.38 |
| 5 | 80s | N | N | Y | Y | N | Y | Y | Y | LICA T-occlusion | 9 | No | None | NA | AF | 0.4 | -0.05 | 0.12 |
| 6 | 70s | N | N | Y | Y | N | Y | Y | Y | LMCA | Wake up stroke | No | Aspirin | NA | AF | 0.2 | -0.19 | <0.0001 |
| 7 | 80s | N | N | Y | Y | N | N | N | N | LMCA | 4 | No | Aspirin | NA | AF | 0.5 | -0.14 | 0.001 |
| 8 | 60s | N | N | N | Y | N | N | N | N | RMCA | 4 | Yes | None | NA | AF, new | 0.4 | -0.30 | 0.0003 |
| 9 | 80s | N | N | Y | N | N | Y | N | N | RMCA | Wake up | Yes | Aspirin | NA | AF, new | 0.9 | -0.11 | 0.10 |
| 10 | 70s | N | N | Y | Y | N | N | Y | N | BA | Wake up | No | Aspirin | NA | AF, new | 0.6 | -0.04 | 0.08 |
| 11 | 60s | Y | N | Y | N | N | Y | N | Y | LMCA | Wake up | No | Apixaban, 5 mg td | 0 | AF, late | 0.0 | -0.15 | 0.45 |
| 12 | 60s | N | N | Y | N | N | N | N | N | LMCA | 5 | Yes | None | NA | AF | 0.3 | -0.14 | 0.01 |
| | | | | | | | | | | | | | | | AF, new | 0.5 | -0.07 | 0.27 |

Figure 6

Table 1A. AF clots (cont')

| 13 | 60s | N | Y | Y | Y | Y | N | Y | Y | Y | RMCA | 2 | No | Rivaroxaban 20 mg | 0 | AF | 0.7 | 0.07 | 0.44 |
|----|-----|---|---|---|---|---|---|---|---|---|------|---|----|-------------------|---|----|-----|------|------|
| 14 | 60s | N | Y | Y | Y | Y | N | Y | Y | N | LMCA | Wake up stroke | No | Plavix | NA | AF, late | 0.1 | -0.05 | 0.01 |
| 15 | 80s | N | N | Y | Y | Y | N | Y | Y | Y | RMCA | Wake up stroke | No | None | NA | AF | 0.4 | -0.05 | 0.008 |
| 16 | 80s | N | N | Y | N | N | N | N | N | Y | LICA+LMCA | Wake up stroke | No | None | NA | AF | 0.81 | -0.02 | 0.5 |
| 17 | 70s | N | Y | Y | Y | Y | N | N | N | Y | LMCA | 5.5 | No | Aspirin | NA | AF | 0.25 | -0.06 | 0.01 |
| 18 | 50s | N | N | Y | Y | N | N | N | N | Y | LICA | 6.5 | Yes | Clopidogrel | NA | AF | 0.34 | -0.02 | 0.04 |

IV-tPA -- intravenous atelplase, NOAC -- new oral anticoagulants, CTA -- CT angiography, PFO -- patent foramen ovale, LICA -- left internal carotid artery, RICA -- right internal carotid artery, L/RMCA- left/right middle cerebral artery, BA -- basilar artery, AF -- atrial fibrillation, AS -- atherosclerosis, Cr- cryptogenic stroke, IE -- infective endocarditis, ME -- marantic endocarditis, CHF -- severe congestive heart failure, Onc.. --active malignancy, LMWH -- low molecular weight heparin, Cx -- complex cardioembolic etiology other than untreated AF, AF new/late -- new diagnosis of AF at presentation/later diagnosis of AF on follow-up -- marked also by yellow background

Figure 6 (cont')

Table 1B. AS clots

| # | Age | Smokers | Diabetes | HTN | Dysl. | PVD | IHD | CHF | AF | Occluded Vessel | Onset to Thrombus time (Hrs) | IV tPA bridging | Current Antithrombotic Treat | INR or NOAC levels (ng/ml) | Susp. Etiology | Thrombin activity decay (7th hr ratio) | Decay Slope | p |
|---|---|---|---|---|---|---|---|---|---|---|---|---|---|---|---|---|---|---|
| 1 | 80s | N | Y | Y | Y | N | N | N | N | LICA + stenting | 3 | No | Aspirin | NA | AS | 1.4 | -0.001 | 0.94 |
| 2 | 40s | Y | Y | Y | Y | N | N | N | N | RMCA, RCCA stenting | 6.5 | Yes | None | NA | AS | | -0.05 | 0.26 |
| 3 | 50s | Y | N | Y | Y | Y | N | N | N | LMCA | 7.5 | No | Aspirin | NA | AS | 0.7 | -0.03 | 0.06 |
| 4 | 40s | Y | N | Y | Y | N | N | N | N | LICA + stenting | 3 | No | None | NA | AS | 1.8 | 0.06 | 0.24 |
| 5 | 60s | N | N | Y | Y | N | N | N | N | LICA, stenting | Wake up stroke | Yes | None | NA | AS | 0.6 | 0.02 | 0.89 |
| 6 | 70s | N | Y | Y | Y | N | N | N | N | LICA, stent thrombosis | 3 | No | None | NA | AS, Stent thrombosis | 2.4 | 0.29 | 0.003 |
| 7 | 80s | N | N | Y | Y | N | Y | Y | N | RICA, stenting | 10 | No | Aspirin | NA | AS | 3.0 | 0.34 | 0.03 |
| 8 | 50s | N | N | N | N | N | N | N | N | LICA | 2.5 | No | None | NA | AS, Dissection | 3.0 | 0.37 | 0.15 |
| 9 | 50s | Y | N | Y | Y | N | N | N | N | LACA | 7 | Yes | Aspirin | NA | AS | 3.8 | 0.28 | 0.42 |
| 10 | 60s | N | N | N | N | N | N | N | N | BA | 15 | No | None | NA | AS, BA stenting | 1.7 | -0.35 | 0.03 |
| 11 | 70s | N | Y | Y | Y | N | Y | N | N | BA | Wake up | No | Aspirin | NA | AS, BA stenting | 0.8 | -0.03 | 0.19 |
| 12 | 70s | N | N | Y | N | N | N | N | N | LMCA | Wake up | No | None | NA | AS, LICA stenting | 0.6 | -0.03 | 0.41 |
| 13 | 70s | N | Y | Y | Y | N | N | N | N | LICA | Wake up stroke | No | Aspirin | NA | AS, LICA stenting | 0.7 | 0.10 | 0.11 |

Figure 6 (cont')

Table 1B. AS clots (cont')

| 14 | 50s | Y | Y | Y | N | N | N | RICA | 6 | No | None | NA | AS, RICA stenting | 0.8 | 0.06 | 0.63 |
| --- | --- | --- | --- | --- | --- | --- | --- | --- | --- | --- | --- | --- | --- | --- | --- | --- |
| 15 | 60s | Y | Y | Y | N | N | N | LICA, stenting | Wake up stroke | No | Aspirin | NA | AS, LICA stenting | 1.17 | 0.001 | 0.8 |

IV-tPA – intravenous atelplase, NOAC – new oral anticoagulants, CTA – CT angiography, PFO – patent foramen ovale, LICA – left internal carotid artery, RICA – right internal carotid artery, L/RMCA- left/right middle cerebral artery, BA – basilar artery, AF – atrial fibrillation, AS – atherosclerosis, Cr- cryptogenic stroke, IE – infective endocarditis, ME – marantic endocarditis, CHF – severe congestive heart failure, Onc.. – active malignancy, LMWH – low molecular weight heparin, Cx – complex cardioembolic etiology other than untreated AF, AF new/late – new diagnosis of AF at presentation/later diagnosis of AF on follow-up – marked also by yellow background

Figure 6 (cont')

Table 1C. Cryptogenic clots

| # | Age | Smoker | Diabetes | HTN | Dysl | PVD | IHD | CHF | AF | Occluded Vessel | Onset to Thrombus time (Hrs) | IV tPA bridging | Current Antithrombotic Treat | INR or NOAC levels (ng/ml) | Susp. Etiology | Thrombin activity decay (7th:1st hr ratio) | Decay Slope | p |
|---|---|---|---|---|---|---|---|---|---|---|---|---|---|---|---|---|---|---|
| 1 | 70s | N | N | Y | Y | N | N | N | N | RMCA | 2.5 | No | Aspirin | NA | Cr, POD 4 post CABG | 0.5 | -0.02 | 0.14 |
| 2 | 80s | Y | N | Y | Y | N | N | N | N | LMCA | 6.5 | Yes | Aspirin | NA | Cr | 0.3 | -0.06 | 0.02 |
| 3 | 60s | N | N | N | N | N | N | N | N | LICA T-occlusion | 3 | No | None | NA | Cr | | | |
| 4 | 80s | N | Y | Y | Y | N | N | N | N | LMCA | 4 | Yes | None | NA | Cr | 0.5 | -0.49 | 0.01 |
| 5 | 60s | N | Y | Y | Y | N | N | N | N | LICA T-occlusion | 4 | Yes | Aspirin | NA | Cr | 0.4 | -0.11 | 0.05 |
| 6 | 60s | N | N | N | Y | N | Y | Y | N | BA | 8.5 | No | None | NA | Cr | 0.2 | -0.43 | 0.01 |
| 7 | 70s | N | Y | Y | Y | N | Y | N | N | BA | Wake up stroke | No | Aspirin | NA | Cr | 1.5 | -0.01 | 0.86 |
| 8 | 60s | Y | N | Y | Y | N | N | N | N | LMCA | 3 | Yes | Aspirin | NA | Cr | 1.7 | 0.04 | 0.02 |
| 9 | 40s | N | N | Y | Y | N | N | N | N | LICA | Wake up stroke | No | Aspirin | NA | Cr | 0.8 | -0.01 | 0.10 |
| 10 | 80s | N | N | Y | Y | N | N | N | N | LMCA | Wake up | No | Aspirin | NA | Cr | 5.9 | 0.04 | 0.003 |
| 11 | 80s | N | N | N | N | N | N | N | N | RMCA | Wake up | No | None | NA | Cr | 1.3 | 0.03 | 0.56 |
| 12 | 60s | N | Y | Y | Y | N | Y | N | N | LMCA | 7 | Yes | Aspirin | NA | Cr | 1.1 | -0.02 | 0.20 |
| 13 | 60s | N | N | Y | Y | N | Y | N | N | LICA | Wake up | No | Aspirin, Clopidogrel | NA | Cr | 0.7 | -0.07 | 0.02 |
| 14 | 50s | N | N | N | N | N | N | N | N | LMCA | 5 | Yes | None | | | 0.1 | -0.02 | 0.44 |
| 15 | 60s | N | Y | Y | N | N | N | N | N | LMCA | 4 | No | None | NA | Cr | 0.4 | -0.14 | 0.16 |
| 16 | 70s | N | N | N | N | N | N | N | N | BA | Wake up stroke | No | None | NA | Cr | 0.3 | -0.07 | 0.01 |
| 17 | 80s | N | Y | Y | Y | N | N | N | N | LMCA | Wake up stroke | No | None | NA | Cr | 0.35 | -0.21 | 0.02 |
|   |     |   |   |   |   |   |   |   |   |      |                 |    |      |    |    | 0.57 | -0.02 | 0.3 |

IV-tPA -- intravenous atelplase, NOAC -- new oral anticoagulants, CTA -- CT angiography, PFO -- patent foramen ovale, LICA -- left internal carotid artery, RICA -- right internal carotid artery, L/RMCA - left/right middle cerebral artery, BA -- basilar artery, AF -- atrial fibrillation, AS -- atherosclerosis, Cr-- cryptogenic stroke, IE -- infective endocarditis, ME -- marantic endocarditis, CHF -- severe congestive heart failure, Onc... -- active malignancy, LMWH -- low molecular weight heparin, Cx -- complex cardioembolic etiology other than untreated AF, AF new/late -- new diagnosis of AF at presentation/later diagnosis of AF on follow-up -- marked also by yellow background

Figure 6 (cont')

Table 1D. Complex cardioembolic clots

| # | Age | Smoker | Diabetes | HTN | DysL | PVD | IHD | CHF | AF | Occluded Vessel | Onset to Thrombus time (Hrs) | IV tPA bridging | Current Antithrombotic Treat. | INR or NOAC levels (mg/ml) | Susp. Etiology | Thrombin activity decay (7-1 hr ratio) | Decay Slope | p |
|---|---|---|---|---|---|---|---|---|---|---|---|---|---|---|---|---|---|---|
| 1 | 60s | N | N | Y | Y | N | N | N | N | LMCA | 4 | No | LMWH 60 mg td | NA | Cr, Onc. | 0.0 | -0.12 | 0.01 |
| 2 | 60s | Y | N | Y | Y | N | Y | Y | Y | RMCA | 9 | Yes | Warfarin, Aspirin | 1.8 | CE, Mv | 0.5 | -0.07 | 0.46 |
| 3 | 60s | N | Y | Y | Y | N | N | N | N | RMCA | 3 | No | None | NA | CE, Onc. ME | 0.7 | -0.07 | 0.15 |
| 4 | 70s | N | Y | Y | Y | N | N | N | N | LMCA | 4 | No | Warfarin, Aspirin | 2.0 | CE, MV | 0.3 | -0.04 | 0.03 |
| 5 | 50s | Y | Y | Y | Y | N | Y | Y | N | BA | Wake up | No | Aspirin | NA | Cr, CHF | 1.0 | -0.63 | 0.15 |
| 6 | 50s | Y | N | N | N | N | N | N | N | LMCA | Wake up | No | None | NA | Cr, PFO | 0.8 | -0.39 | 0.25 |
| 7 | 60s | N | N | N | Y | N | N | N | Y | RMCA | 5 | No | LMWH 60 mg td | NA | AF, Onc. | 0.6 | -0.11 | 0.15 |
| 8 | 70s | N | Y | Y | Y | N | N | N | Y | RMCA | 3.5 | No | Apixaban 5 mg td | 148 | IE | -0.1 | -0.09 | 0.001 |

IV-tPA -- intravenous atelplase, NOAC -- new oral anticoagulants, CTA -- CT angiography, PFO -- patent foramen ovale, LICA -- left internal carotid artery, RICA -- right internal carotid artery, L/RMCA- left/right middle cerebral artery, BA -- basilar artery, AF -- atrial fibrillation, AS -- atherosclerosis, Cr- cryptogenic stroke, IE -- infective endocarditis, ME -- marantic endocarditis, CHF -- severe congestive heart failure, Onc.. -- active malignancy, LMWH -- low molecular weight heparin, Cx -- complex cardioembolic etiology other than untreated AF, AF new/late -- new diagnosis of AF at presentation/later diagnosis of AF on follow-up -- marked also by yellow background

Figure 6 (cont')

Table 1E. Anticoagulated Atrial Fibrillation clots

| # | Age | Smoker | Diabetes | HTN | DysL | PVD | IHD | CHF | AF | Occluded Vessel | Onset to Thrombus time (Hrs) | IV/tPA bridging | Current Antithrombotic Treat. | INR or NOAC levels (ng/ml) | Susp. Etiology | Thrombin activity decay (1st hr ratio) | Decay Slope | Decay p |
|---|---|---|---|---|---|---|---|---|---|---|---|---|---|---|---|---|---|---|
| 1 | 80s | N | Y | Y | Y | N | N | N | Y | LMCA | 7.5 | No | Apixaban | 26 | AF | 1.2 | 0.001 | 0.94 |
| 2 | 60s | N | Y | Y | Y | N | Y | Y | Y | RMCA | Wake up stroke | No | Warfarin | 1.4 | AF | 2.2 | 0.06 | 0.15 |
| 3 | 80s | N | Y | Y | Y | N | Y | Y | Y | BA | Wake up stroke | No | Apixaban 2.5 td, Aspirin | 26 | AF | 0.6 | -0.10 | 0.03 |
| 4 | 80s | N | N | Y | N | N | Y | N | Y | RMCA | Wake up | No | Rivaroxaban 20 mg | 39 | AF | 0.6 | -0.16 | 0.01 |
| 5 | 70s | N | N | Y | Y | N | N | Y | Y | RMCA | Wake up | No | LMWH 40 mg td | NA | AF | 0.7 | -0.04 | 0.04 |
| 6 | 80s | N | N | Y | Y | N | Y | Y | Y | LICA T-occlusion | 5.5 | Yes | Warfarin | 1.5 | AF | 1.1 | 0.02 | 0.62 |
| 7 | 80s | N | N | Y | N | N | Y | Y | Y | RMCA | 4 | No | Warfarin | 1.2 | AF | 0.4 | -0.02 | 0.009 |
| 8 | 90s | N | Y | Y | Y | N | N | N | Y | LICA | Wake up stroke | No | Apixaban 2.5 mg td | NA | AF | 0.77 | -0.03 | 0.16 |
| 9 | 80s | N | N | Y | Y | N | N | N | Y | LICA T-occlusion | Wake up stroke | No | Dabigatran 110 mg td | NA |  | 1.02 | 0.02 | 0.7 |
| 10 | 80s | N | N | Y | Y | Y | Y | N | Y | RICA | 3.5 | No | Rivaroxaban | 120 | AF | 1.65 | 0.01 | 0.1 |

IV-tPA – intravenous ateplase, NOAC – new oral anticoagulants, CTA – CT angiography, PFO – patent foramen ovale, LICA – left internal carotid artery, RICA – right internal carotid artery, L/RMCA- left/right middle cerebral artery, BA – basilar artery, AF – atrial fibrillation, AS – atherosclerosis, Cr- cryptogenic stroke, IE – infective endocarditis, ME – marantic endocarditis, CHF – severe congestive heart failure, Onc.. – active malignancy, LMWH – low molecular weight heparin, Cx – complex cardioembolic etiology other than untreated AF, AF new/late – new diagnosis of AF at presentation/later diagnosis of AF on follow-up – marked also by yellow background

Figure 6 (cont')

METHODS AND KITS FOR IDENTIFYING THROMBUS ORIGIN AND OPTIMIZING POST-ISCHEMIC EVENT TREATMENT

CROSS REFERENCE TO RELATED APPLICATIONS

This application is a National Phase of PCT Patent Application No. PCT/IL2020/050816 having International filing date of Jul. 23, 2020, which claims the benefit of priority of U.S. Provisional Patent Application No. 62/880,681, filed Jul. 31, 2019 the contents of which are all incorporated herein by reference in their entirety.

FIELD OF THE INVENTION

Provided herein are method and kits for identifying thrombus origin based on temporal thrombin activity assay, and use thereof for optimizing post-ischemic event treatment, and further preventing recurrence of secondary ischemic events.

BACKGROUND

One of the more common, medically challenging and health-threatening ischemic events, world-wide, is ischemic stroke. It is a major cause of morbidity and mortality in adults accounting to about 1M new patients, annually, in the U.S.

The high rates of recurrent stroke episodes, of up to 20-30% in the first year after an initial ischemic stroke, primarily, cryptogenic stroke (Cr), despite allegedly optimal medical treatment aimed mainly to platelet activation inhibition, raise the need for an efficient diagnostic tool with high specificity. Etiology categorization of ischemic events in general is of paramount importance in the field of secondary treatment and prevention of recurrence, namely, in the choice of the best long-term antithrombotic therapy (i.e.—antiplatelet versus anticoagulation agents). Thus, following ischemic event, patients undergo lengthy diagnostic tests in an attempt to determine underlying risk factors and ultimately potential etiology which is required for determining a suitable treatment. These tests include extensive blood tests, long-term heart rate monitoring and, at times, invasive cardiac imaging for the purpose of achieving accurate secondary prevention. However, approximately 40% of patients' pathogenesis remains unclear which challenges the physicians who are unable to customize an appropriate category/origin—specific maintenance and preventive treatment regimen aimed at preventing future events.

There is an unmet need for an accurate and fast identification of thrombus origin which can be utilized for tailoring an optimal secondary treatment aimed at preventing recurrence of ischemic events.

SUMMARY

There are provided method and kits for identifying thrombus origin and uses thereof for optimizing post-ischemic event treatment, and for preventing the recurrence of secondary ischemic event(s).

Ischemic events refer to heterogeneous diseases with several hemostatic mechanisms involved in the different etiological types of the event. This poses challenges to the physician in terms of accurate diagnosis and secondary prevention. Surprisingly, it was found that the temporal pattern of thrombin activity and secretion differentiates between thrombi etiology, in particular, between cardioembolic and atherosclerotic thrombi. Accordingly, the methods, system and kits disclosed herein provide a simple, rapid, and cost-effective identification of thrombus origin, thereby determining the type of event caused by that thrombus, with exceptionally high sensitivity.

The present disclosure solves the problem of false/inaccurate categorizations, particularly associated with cryptogenic strokes (Cr), the etiology of which could not be accurately assessed by the methods known to date, including, but not limited to, histology, electrocardiography (ECG) and Holter. It should be noted that false and/or inaccurate identification of thrombus origin results in the administration of the wrong preventive regimen, which may be life threatening. For example, antiplatelet treatment administered to a patient wrongly diagnosed as susceptible to recurrent stroke episode(s) from atrial fibrillation (AF) may cause lethal hemorrhage. Advantageously, the reliable identification of thrombus origin as disclosed herein can be performed in thrombus obtained from patients already undergoing maintenance or prevention treatments, such as, thrombolytic medications (e.g. Alteplase) or anticoagulant treatments. Unexpectedly, maintenance or prevention treatments do not alter the identification of thrombus etiology according to the methods and kits disclosed herein, presumably, as these treatments do not have an effect on thrombin activity.

Surprisingly, the methods, kits and systems disclosed herein demonstrate, for the first time, that thrombin activity or thrombin level over time is a unique and specific marker for thrombus origin. While the results indicate that reduction in the level of thrombin over time indicates that the origin of the thrombus is arterial fibrillation, the present disclosure enables investigation and identification of various sources of ischemic events, based on thrombin temporal profile.

In some embodiments, there is provided a method for identifying thrombus origin, the method comprising
(a) incubating a sample of a thrombus in a reaction buffer; and
(b) determining the level of thrombin in the reaction buffer at a plurality of time points.

In some embodiments, the thrombus is a thrombus obtained from a subject following ischemic event.

In some embodiments, reduction in the level of thrombin indicates that the origin of said thrombus is arterial fibrillation.

In some embodiments, increased or unchanged level of thrombin indicates that the origin of said thrombus is arteriosclerosis.

In some embodiments, the method further comprising adding a thrombin substrate to the reaction buffer prior to said determining.

In some embodiments, the method further comprising removing the sample of the thrombus from the reaction buffer prior to step (b) or prior to said adding.

In some embodiments, said incubating comprises a plurality of incubation periods, and wherein the method further comprises replacing the reaction buffer with a fresh reaction buffer at the conclusion of each incubation period.

In some embodiments, the sample of the thrombus comprises one or more fragments of the thrombus.

In some embodiments, each incubation period is carried out in a respective reaction buffer, and wherein reduction in the level of thrombin detected in a reaction buffer from an early incubation period relative to the level of thrombin determined in a reaction buffer from a later incubation period indicates that the origin said thrombus is arterial fibrillation otherwise the origin of said thrombus is arteriosclerosis.

In some embodiments, the method further comprising removing the sample of the thrombus from the reaction buffer prior to said detecting.

In some embodiments, the thrombin substrate comprises a detectable marker.

In some embodiments, the method further comprising applying a treatment regimen comprising anticoagulants upon determining a reduction in the level of thrombin.

In some embodiments, the method further comprising applying a treatment regimen comprising antiplatelet therapy.

In some embodiments, the thrombus is associated with cryptogenic stroke, wherein reduction in the level of thrombin indicates that the origin of said thrombus associated with cryptogenic stroke is arterial fibrillation, otherwise the origin of said thrombus associated with cryptogenic stroke is arteriosclerosis.

In some embodiments, there is provided a method for preventing recurrent ischemic event in a subject in need thereof, the method comprising
(a) incubating a sample of a thrombus in a reaction buffer, wherein the subject in need thereof is a subject who underwent an ischemic event and the sample of the thrombus is derived from the subject;
(b) determining the level of thrombin in the reaction buffer at a plurality of time points; and
(c) administering to the subject in need thereof a treatment regimen based on the level of thrombin in the reaction buffer at the plurality of time points.

In some embodiments, the treatment regimen comprising anticoagulants upon determining a reduction in the level of thrombin.

In some embodiments, the treatment regimen comprising antiplatelet therapy upon determining an increased or unchanged level of thrombin.

In some embodiments, the method further comprising adding a thrombin substrate to the reaction buffer prior to said determining.

In some embodiments, the thrombin substrate comprises a detectable marker.

In some embodiments, the ischemic event is a primary ischemic event.

In some embodiments, the method further comprising removing the sample of the thrombus from the reaction buffer prior to step (b) or prior to said adding.

In some embodiments, the method further comprising generating an artificial clot from a blood sample of the subject; and performing steps (a) to (b) on said artificial clot.

In some embodiments, there is provided a kit for determining thrombus origin, the kit comprising
(a) at least one reaction buffer container comprising reaction buffer adapted for incubation of a sample of a thrombus;
(b) at least one thrombin substrate container comprising thrombin substrate for monitoring thrombin activity in the reaction buffer; and
(c) instructions for use of the kit for determining thrombus origin.

In some embodiments, the kit comprises a plurality of reaction buffer containers, each comprising a reaction buffer.

In some embodiments, the kit further comprising at least one device configured for holding a sample of a thrombus, retaining the sample of the thrombus immersed within the reaction buffer within each of said plurality of containers, and transferring the sample of the thrombus from one of said plurality of containers to another.

In some embodiments, the kit further comprising a permeable receptacle adapted for retaining the sample of the thrombus therewithin during incubation in the reaction buffer within each of said plurality of containers and during transferring the sample of the thrombus from one of said plurality of containers to another.

In some embodiments, the at least one reaction buffer container comprising the reaction buffer is a chromatography apparatus having an inert stationary phase configured to maintain the sample of the thrombus therewithin, and further having a mobile phase wherein the mobile phase comprises the reaction buffer.

In some embodiments, the kit further comprising at least one vessel configured to retain therein reaction buffer discharged from the chromatography apparatus.

In some embodiments, the kit comprising positive control for arterial fibrillation, the positive control comprises two containers designated t0 and t1, each comprising thrombin, wherein the amount of thrombin in container t1 is smaller than the amount of thrombin in container to.

In some embodiments, the kit further comprising positive control for arteriosclerosis and cryptogenic stroke, the positive control comprising two containers designated t0 and t1, each container comprising thrombin, wherein the amount of thrombin in container t1 is higher than the amount of thrombin in container t0 or similar to the amount of thrombin in container t0.

In some embodiments, the thrombus is a thrombus obtained from a subject following an ischemic event.

In some embodiments, the kit further comprising a laboratory-generated thrombus created from the blood of the subject.

Certain embodiments of the present disclosure may include some, all, or none of the above advantages. One or more technical advantages may be readily apparent to those skilled in the art from the figures, descriptions and claims included herein. Moreover, while specific advantages have been enumerated above, various embodiments may include all, some or none of the enumerated advantages.

Unless otherwise defined, all technical and scientific terms used herein have the same meaning as commonly understood by one of ordinary skill in the art to which this disclosure pertains. In case of conflict, the patent specification, including definitions, governs. As used herein, the indefinite articles "a" and "an" mean "at least one" or "one or more" unless the context clearly dictates otherwise.

BRIEF DESCRIPTION OF THE DRAWINGS

Some embodiments of the disclosure are described herein with reference to the accompanying figures. The description, together with the figures, makes apparent to a person having ordinary skill in the art how some embodiments may be practiced. The figures are for the purpose of illustrative description and no attempt is made to show structural details of an embodiment in more detail than is necessary for a fundamental understanding of the disclosure. For the sake of clarity, some objects depicted in the figures are not drawn to scale. Moreover, two different objects in the same figure may be drawn to different scales. In particular, the scale of some objects may be greatly exaggerated as compared to other objects in the same figure.

FIG. 6 exhibits clinical data of patients having suspected or confirmed stroke etiology from 5 different origins (Tables 1A to 1E, respectively), and thrombin activity in thrombi retrieved therefrom.

DETAILED DESCRIPTION

Figure 1A:
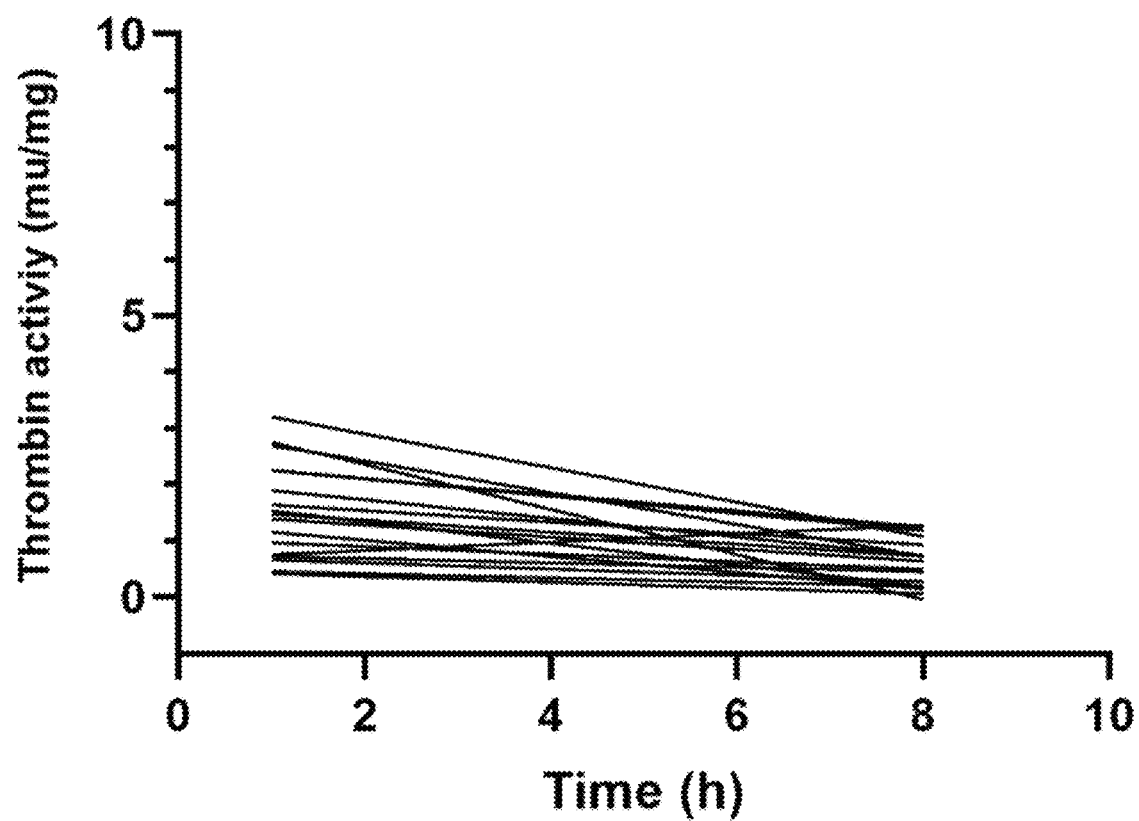
FIGS. 1A and 1B represent thrombin level vs. thrombi incubation time in reaction buffers, of thrombi obtained from exemplary patients diagnosed with atrial fibrillation (AF) and atherosclerosis (AS), respectively.
Figure 1B:
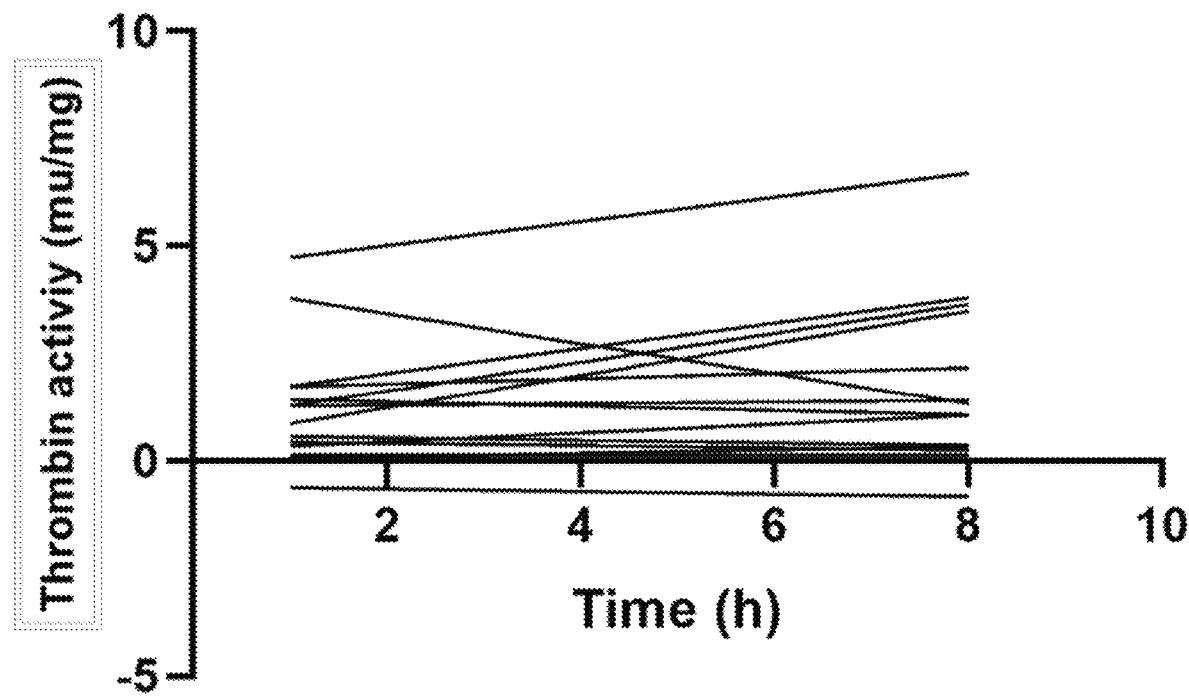

The principles, uses, and implementations of the teachings herein may be better understood with reference to the accompanying description and figures. Upon perusal of the description and figures present herein, one skilled in the art will be able to implement the teachings herein without undue effort or experimentation. In the figures, same reference numerals refer to same parts throughout.

In the description and claims of the application, the words "include" and "have", and forms thereof, are not limited to members in a list with which the words may be associated.

Provided herein are methods and kits, for identification of stroke type according to the origin of the thrombus related to the stroke. The methods and kits disclosed herein are based on a specific and reproducible thrombin activity assay, which essentially distinguishes between the etiologic groups of ischemic strokes, primarily, between arteriosclerosis (AS) and arterial fibrillation (AF).

The term arterial fibrillation as used herein is synonymous with the terms 'AF' and 'cardioembolic stroke.'

To date, categorization of thrombi origin in ischemic stroke patients is performed after endovascular clot retrieval. Patients then undergo lengthy diagnostic tests in an attempt to determine etiology. These tests include extensive blood tests, long-term heart rate monitoring and, at times, invasive cardiac imaging for the purpose of achieving accurate secondary prevention.

Furthermore, a widely accepted assumption is that most cardioembolic clots are linked to atrial fibrillation where stasis of blood, especially in the auricle, predisposes to "red clots" rich in fibrin and red blood cells (RBCs) whereas arterial clots, that tend to form on ruptured plaques and under high shear, are called "white clots" primarily composed of fibrin and platelets. Following widespread use of stent retrievers, several studies have examined the correlation between stroke subtype and histological features of the clots, mainly fibrin, RBCs and platelets. One study found significantly higher proportions of fibrin/platelets, less erythrocytes, and more leucocytes in cardioembolic thrombi than non-cardioembolic thrombi with overlapping results in cryptogenic strokes in terms of both thrombus histology and interventional and clinical outcome parameters. Other studies either failed to establish a clear association between the thrombus composition and the stroke subtype or yielded contradictory results. In a study that used the distribution of platelets in the thrombi and different compositions of the thrombi as a tool to distinguish between the stroke subtypes, platelets were uniquely found in the periphery of arteriogenic thrombi, while RBCs were the most abundant cell in the center of the thrombi. In contrast, the platelets were clustered within fibrin rich areas in most of the cardioembolic thrombi. In some studies T-cells have been shown to be a major component of vulnerable atherosclerotic carotid lesions, where the CD3 T-cell count (quantified by immunohistochemistry) was found to be significantly higher in "atherothrombotic" origin strokes compared to all other causes. However, in other studies that included immunohistological staining of endovascularly retrieved thrombi for CD3, CD20, and CD68/KiM1P, no statistically noticeable differences between stroke subtypes was detected. Thus, definitive diagnosis of morphological differences requires histopathological expertise has not been established, yet.

The methods and kits provided herein offer a beneficial non-invasive, short (may take from 1 up to 10 hours) ex-vivo, elegant assay, for determining thrombi etiology.

Moreover, the methods and kits disclosed herein offer, for the first time, an accurate identification of the origin of cryptogenic clots which are identified in approximately 40% of patients, and their pathogenesis remains unclear under the current methodologies. Due to unclear etiology cryptogenic cases pose a challenge to secondary prevention with high rates of recurrent stroke episodes of up to 20-30% in the first year despite optimal platelet activation inhibition. Advantageously, by applying the methods and kits disclosed herein the origin of cryptogenic clots can be identified. Surprisingly, it has been found that according to the temporal thrombin activity assay disclosed herein, most thrombi associated with cryptogenic stroke behave like AF thrombi and hence the corresponding cryptogenic subject should be assigned to therapy for AF patients. Thus, the present disclosure offers a solution to the challenge of tailoring the right secondary treatment to cryptogenic patients.

The terms "thrombus" and "clot" as used herein are interchangeable.

In some embodiments, there is provided a method for identifying thrombus origin, the method comprising
(a) incubating a sample of a thrombus in a reaction buffer; and
(b) determining the level of thrombin in the reaction buffer at a plurality of time points, thereby identifying the origin of the thrombus.

In some embodiments, the method further comprises determining that the origin of said thrombus is arterial fibrillation or cryptogenic stroke, when the level of thrombin decreases.

In some embodiments, the method further comprises determining that the origin of said thrombus is arteriosclerosis when the level of thrombin increases or remains unchanged.

It is to be understood that the reduction in the level of thrombin refers to reduction in time, namely, reduction from a maximum value at the initial time point followed by lower levels of thrombin in later time point(s).

Determination of thrombin activity, and/or thrombin's level may be performed by any suitable procedure, which can directly or indirectly determine and/or detect thrombin activity and/or thrombin level. The procedure may include the use of a thrombin substrate, and determination of thrombin level based on/derived from the interaction between thrombin and the substrate.

In some embodiments, the method further comprising adding thrombin substrate to the reaction buffer prior to said determining.

In some embodiments, the method further comprising removing the sample of the thrombus from the reaction buffer prior to step (b). In some embodiments, the method further comprising removing the sample of the thrombus from the reaction buffer prior to said adding thrombin substrate. In some embodiments, the method further comprising removing the sample of the thrombus from the reaction buffer prior to step (b) or prior to said adding thrombin substrate.

In some embodiments, the method further comprising provided a sample of a thrombus, prior to step (a).

In some embodiments, steps (a) to (b) constitute a reaction, a reaction cycle, or a cycle, of the method for identifying thrombus origin. Accordingly, in some embodiments, the method comprises a plurality of reactions/cycles, wherein in step (a) of each cycle the sample of the thrombus is incubated in a fresh reaction buffer, and in step (b) of each reaction determination is carried out in the presence or absence of the sample of the thrombus.

The term "fresh reaction buffer" as used herein refer to reaction buffer prior to being used, specifically, prior to include therewith a thrombus, a sample of a thrombus or one or more fragments of a thrombus. Once a thrombus is incubated in a fresh reaction buffer, the reaction buffer is not considered fresh any longer, and may be considered incubation buffer/media.

In some embodiments, a reaction or a cycle includes a plurality of steps (a), wherein the adding and determining steps are performed after completing the assay, namely, after performing a plurality of steps (a) over a predetermined time period, wherein each reaction buffer (i.e. each incubation buffers) from each incubation period, is stored, once the incubation period has been completed. In some embodiments, after concluding the assay, the method further includes adding thrombin substrate to each stored reaction buffer corresponding to a specific step (a), and determining thrombin level in the plurality of reaction buffers. In some embodiments, said determining thrombin level in the plurality of reaction buffers comprises determining thrombin activity profile over the predetermined time period, or over certain time points thereof.

In some embodiments, the reaction buffer of each incubation period is stored at room temperate, below room temperature, in a temperature within the range of 15 to 4 deg. Celsius, or in a temperature below 4 deg. Celsius. Each possibility is a separate embodiment of the present invention.

According to some embodiments, said adding thrombin substrate is carried out at the end of the plurality of incubation periods, wherein thrombin substate is added to each reaction buffer corresponding to each incubation period of the plurality of incubation periods. Following the addition of thrombin substrate, thrombin activity/level is determined in each reaction buffer.

Active thrombin is a constituent of many thrombi and its activity in various tissues may be measured by a specific and unique fluorescence assay (e.g., Reuveni G., Goldman V, Shavit-Stein E. et al., Neuroreport, 28(17): 1176-1179, 2017). Thrombin is an essential component in the coagulation cascade, where its generation is markedly enhanced in acute ischemic stroke in young patients' plasma. It was previously established that thrombin activity is significantly higher in the ischemic hemisphere of an animal model of acute stroke in comparison to the contralateral hemisphere (Bushi D, Chapman J., Katzav A. et al., J Mol Neurosci., 51(3): 844-850, 2013). Further, a prospective cohort study indicated that increased thrombin generation in the plasma of elderly patients as measured by Calibrated Automated Thrombogram is an independent predictor of ischemic stroke, especially cardioembolic stroke. Moreover, thrombin generation, as measured in peripheral blood samples, in patients with acute cardioembolic and non-cardioembolic ischemic stroke was found variable but overall higher compared to healthy subjects. In addition, studies on mouse models of epilepsy and stroke found a link between elevated thrombin activity and its receptor (Chapman J., Semin Thromb Hemost., 2013, doi:10.1055/s-0033-1357482 and Itsekson-Hayosh Z, Shavit-Stein E, Last D, et al. J Mol Neurosci., 56:644-651, 2015).

In some embodiments, the reaction buffer comprises one or more of at least one endopeptidase inhibitor and macromolecules for elevating medium viscosity, such as, albumin (e.g. bovine serum albumin—BSA), gelatin and casein.

In some embodiments, the reaction buffer comprises albumin. In some embodiments, the reaction buffer comprises bovine serum albumin and calcium.

The endopeptidase inhibitor may be, or may comprises, any one or more of a neutral endopeptidase inhibitors, such as, bestatin hydrochloride, prolyl endopeptidase inhibitor and/or alpha-NAPAP.

In some embodiments, the thrombin substrate comprises a detectable label (or agent or substrate) capable of emitting detectable radiation, or capable of causing emission of detectable radiation (for example, by radioactive decay, chemical reaction, fluorescence excitation, spin resonance excitation, etc.). In various embodiments, such a detectable agent may be a gold nanoparticle, an enzyme (e.g. horseradish peroxidase), an organic dye or a fluorescent nanocrystal (quantum dot) as well as other similar agents known to those skilled in the art. Visualization of the signal in the detection zone can occur under daylight illumination of a wide spectrum or through the use of narrow spectral sources.

In some embodiments, the thrombin substrate is a synthetic peptide.

The terms 'level of thrombin' and 'thrombin activity' as used herein are interchangeable. In some embodiments, the determined level of thrombin corresponds to the amount of thrombin substrate measured at the end of each incubation period. In some embodiments, the determined level of thrombin corresponds to the detectable level of labeled thrombin substrate, measured at the end of each incubation period. In some embodiments, the level of thrombin corresponds to the ability of thrombin to proteolytically cleave the thrombin substrate. In some embodiments, the level of thrombin corresponds to the ability of thrombin to proteolytically cleave the thrombin substrate Boc-Asp(OBzl)-Pro-Arg-AMC and release a fluorophore, 7-amino-4-methylcoumarin (AMC), which can be easily quantified by fluorescence.

In some embodiments, the thrombus is a thrombus obtained from a subject following ischemic stroke. In some embodiments, the thrombus is obtained from a subject following a primary ischemic stroke. In some embodiments, the thrombus is retrieved from a stent, following an ischemic event.

The term "ischemic event" as used herein includes any physiological even leading to inadequate blood supply resulting with formation of one or more thrombi. Thus, the term ischemic event includes, but is not limited to, ischemic stroke, acute ischemia of the limb, acute myocardial infarction and acute mesenteric ischemia.

In some embodiments the thrombus is obtained from a subject following ischemic stroke.

In some embodiments the thrombus is obtained from a subject following an acute ischemia of the limb or acute myocardial infarction.

The terms 'acute ischemia of the limb' or 'acute limb ischemia' refer to an ischemic limb typically caused by embolism or thrombosis. Thrombosis is usually caused by peripheral vascular disease (atherosclerotic disease that leads to blood vessel blockage), while an embolism is usually of cardiac origin. With proper surgical care, acute limb ischemia is a highly treatable condition; however, delayed treatment (beyond about 12 hours) may result in permanent disability, amputation and/or death.

The terms 'acute myocardial infarction', 'myocardial infarction', 'MI', 'AMI' and 'heart attack' refer to a life-threatening condition occurring when the blood flow to the heart muscle is abruptly cut off, causing tissue damage. This phenomenon is commonly the result of a blockage in one or more of the coronary arteries. A blockage may develop due to buildup of plaque mostly made of fat, cholesterol and cellular waste products.

It is to be understood that in the context of thrombin temporal activity and hence the methods and kits disclosed herein, the terms 'ischemic stroke', 'acute myocardial infarction' and 'acute limb ischemia' are interchangeable, although those pathologies are distinctly different from one another.

It is to be understood that 'reduction in the level of thrombin' and decrease in the level of thrombin' are interchangeable and refer to an overall negative (<0) slope in a regression analysis curve of thrombin level as measured at a plurality of time points, according to the method disclosed herein. In this respect, an increase in the level of thrombin or an unchanged level of thrombin indicate that a regression analysis curve of the level of thrombin, such as in the case of arteriosclerosis (AS) has a positive slope (>0) or is substantially constant (~0), respectively.

In some embodiments, said determining the level of thrombin in the reaction buffer at a plurality of time points, comprises determining the level of thrombin in the reaction buffer following a first time period of incubation in the reaction buffer, and following at least one or more consecutive periods of incubation in the reaction buffer, at least two or more consecutive periods of incubation in the reaction buffer, at least three or more consecutive periods of incubation in the reaction buffer, at least four or more consecutive periods of incubation in the reaction buffer, at least five or more consecutive periods of incubation in the reaction buffer, at least six or more consecutive time periods of incubation in the reaction buffer, at least seven or more consecutive time periods of incubation in the reaction buffer, at least eight or more consecutive time periods of incubation in the reaction buffer, at least nine or more consecutive time periods of incubation in the reaction buffer, or at least ten or more consecutive time periods of incubation in the reaction buffer. Each possibility is a separate embodiment of the present invention.

In some embodiments, said incubating comprises a plurality of incubation periods, and wherein said determining is carried out at the conclusion of each incubation period and following the addition of thrombin substrate.

In some embodiments, said incubating comprises a plurality of incubation periods, and wherein said determining is carried out at the conclusion of the plurality of incubation periods and following the addition of thrombin substrate to each reaction buffer corresponding to each incubation period.

In some embodiments, the method further comprising replacing the reaction buffer with a fresh reaction buffer at the conclusion of each incubation period, after said determining.

In some embodiments, the method may further comprise:
i. incubating the sample of the thrombus in a first reaction buffer;
ii. adding the thrombin substrate to the first reaction buffer;
iii. determining the level of thrombin in the first reaction buffer;
iv. transferring the sample of thrombus to a second reaction buffer for further incubation;
v. adding the thrombin substrate to the second reaction buffer; and
vi. determining the level of thrombin in the second reaction buffer.

In some embodiments, reduction in the level of thrombin determined in the second reaction buffer relative to the level of thrombin determined in the first reaction buffer indicates that the origin said thrombus is arterial fibrillation.

In some embodiments, an increase or no substantial difference in the level of thrombin determined in the second reaction buffer relative to the level of thrombin determined in the first reaction buffer indicates that the origin of said thrombus is arteriosclerosis.

The term 'substantially constant' as used herein refers to changes in the level of thrombin, or in thrombin activity, that are statistically insignificant, and/or below detection sensitivity and the like. Alternatively, no substantial difference may be interpreted as no difference, or constant level, overtime.

In some embodiments, the method further comprises repeating steps (iv) to (vi), wherein in each repetition the sample of the thrombus is incubated in a fresh reaction buffer, optionally, thrombin substrate is added to the reaction buffer in each repetition, or at the completion of the assay, and said determining comprises determining the level of thrombin in each of the plurality of reaction buffers at corresponding consecutive plurality of incubation time periods.

In some embodiments, the method further comprising transferring the sample of the thrombus from one reaction buffer to another (e.g. from the first reaction buffer to the second reaction buffer), prior to said adding, namely, prior to step (ii). In some embodiments, the method further comprising transferring the sample of the thrombus from one reaction buffer to another (e.g. from the first reaction buffer to the second reaction buffer) prior to said determining, namely, prior to step (iii). In some embodiments, the method further comprising transferring the sample of the thrombus from one reaction buffer to another (e.g. from the first reaction buffer to the second reaction buffer) prior to step (ii) or prior to step (iii).

In some embodiments, the method further comprising replacing the reaction buffer with a fresh reaction buffer, between one incubation period to another. In some embodiments, the method further comprising removing the reaction buffer at the end of each incubation period and adding a fresh reaction buffer; adding to the removed reaction buffer the thrombin substrate, wherein said determining is carried out on the removed reaction buffer which includes the thrombin substrate.

In some embodiments, said incubating the sample of the thrombus in a first reaction buffer comprises incubating the sample of the thrombus in a first reaction buffer for a first incubation time period.

In some embodiments, said further incubation comprises incubation for a second incubation time period in a second reaction buffer.

The terminology 'first' and 'second' as used herein merely intends to refer to earlier and later in time, respectively. Thus, first incubation period refers to an incubation period that is earlier than the following (e.g. second, third etc.) incubation periods. Similarly, a first reaction buffer refers to reaction buffer used in a first incubation period, and a second reaction buffer refers to reaction buffer used in a later incubation period (later than the first incubation period), such as the second incubation period.

In some embodiments, at the end of each incubation period each used reaction buffer, also termed herein 'incubation buffer', is transferred to a corresponding vessel and maintained/stored until detection. At the conclusion of the assay, all vessels containing the post incubation reaction buffers are subjected to determination of thrombin level.

In some embodiments, any incubation time period, including said first and second incubation time periods, is no more than an hour. In some embodiments, each incubation time period is 5 minutes, 10 minutes, 15 minutes, 20 minutes, 25 minutes, 30 minutes, 35 minutes, 40 minutes, 45 minutes, 50 minutes or 55 minutes long.

In some embodiments, incubation time counts from the beginning of the incubation step, e.g. from the moment the thrombus is immersed in, or otherwise being in contact with, the reaction buffer, and particularly, from the moment the thrombus is immersed in, or otherwise being in contact with, a fresh reaction buffer.

In some embodiments, the reaction buffers used in each incubation period are identical in contents, namely, consisting of the same components prior to being in contact with a thrombus.

In some embodiments, the method further comprising transferring the sample of the thrombus from each reaction buffer to the next reaction buffer, following said incubating said sample. In some embodiments, the method further comprising transferring the sample of the thrombus from each reaction buffer to the next reaction buffer, following said adding thrombin substrate to the reaction buffer comprising said sample. In some embodiments, the method further comprising transferring the sample of the thrombus from each reaction buffer to the next reaction buffer, following said incubating said sample or following said adding thrombin substrate to the reaction buffer comprising said sample.

In some embodiments, the method further comprises providing a chromatography apparatus having an inert stationary phase; placing the sample of the thrombus in the inert stationary phase; loading the chromatography apparatus with the reaction buffer and with thrombin substrate; determining the level of thrombin activity in the reaction buffer within the chromatography apparatus, at a plurality of time points; and, optionally, repeating said loading and said determining a plurality of times.

In some embodiments, the method further comprises providing a chromatography apparatus having an inert stationary phase; placing the sample of the thrombus in the inert stationary phase; loading the chromatography apparatus with the reaction buffer; determining the level of thrombin activity in the reaction buffer discharged from the chromatography apparatus; and, optionally, repeating said loading and said determining a plurality of times.

In some embodiments, the determining the level of thrombin activity in the reaction buffer discharged from the chromatography apparatus comprises adding thrombin substrate to reaction buffer aliquots discharged from the chromatography at a plurality of time point, and determining the level of thrombin activity in each aliquot.

In some embodiments, the chromatography apparatus is a column, also termed column chromatography. In some embodiments, the chromatography apparatus is a plane, such as a lateral flow test apparatus. It is to be understood that the setup of the chromatography apparatus for the purpose of the thrombin assay disclosed herein may vary, and may be in a column or in a plane or any other configuration suitable for the purpose of determining thrombin activity as disclosed herein.

In some embodiments, the inert stationary phase is a solid phase configured to hold the sample of the thrombus stably throughout the assay, including through the loading and determining steps.

The term 'inert solid phase' as used herein refers to a solid phase made of compounds that do not interact with any of the reaction buffer components, the thrombin substrate and the thrombus. In some embodiments, the inert solid phase comprises cellulose.

In some embodiments, loading the chromatography apparatus with the reaction buffer and, optionally, the thrombin substrate is carried out at discrete time points, such as, every 5, 10, 15, 20, 25, 30, 35, 40, 45, 50, 55 or 60 minutes. In some embodiments, loading the chromatography apparatus with the reaction buffer and, optionally, the thrombin substrate is carried out automatically at discrete time points. In some embodiments, loading the chromatography apparatus with the reaction buffer and, optionally, the thrombin substrate is carried out automatically at discrete, pre-determined, time points.

In some embodiments, incubating a sample of a thrombus in a reaction buffer (step (a)) includes loading the sample of the thrombus onto a chromatography apparatus comprising reaction buffer as the mobile phase, and said determining the level of thrombin in the reaction buffer at a plurality of time points (step (b)) includes determining the level of thrombin in the mobile phase at a plurality of time points.

In some embodiments, the mobile phase of the chromatography apparatus further comprises thrombin substrate, and said determining the level of thrombin in the chromatography apparatus at a plurality of time points includes detecting the level of thrombin substrate in the mobile phase of the chromatography apparatus at a plurality of time points thereby determining the level of thrombin at the plurality of time points.

In some embodiments, the method is applied immediately after a thrombus is retrieved, and the thrombin assay for identifying thrombus origin is instantly performed. Thus, the thrombin assay disclosed herein may be performed, in situ, in parallel to a surgical procedure. Advantageously, thrombin temporal activity obtained in situ can be immediately implemented based on the teaching disclosed herein, to determine thrombus origin and hence the course of treatment.

In some embodiments, the method further includes uploading thrombin temporal thrombin activity data to a database or a databank. In some embodiments, the method further includes uploading, for each temporal thrombin activity data, clinical parameters related to the patients whom thrombus was retrieved and analyzed, such as, age, gender, ethnicity, location of thrombus prior to retrieval, treatment regimen administered to the patient prior to thrombus retrieval, medical background and history, and family medical background and history among others.

In some embodiments, the database may be installed on a server. In some embodiments, the server may be within a cloud-based computing environment. In some embodiments, the server may be tangible, namely, a physical device or component in a computing system that receives and retains information from a user of the system. The server may be internal to a computing device, such as a computer's hard drive, or a removable device, such as, an external hard drive or universal serial bus (USB) flash drive.

The database may be associated with an algorithm, a microprocessor, a circuit board and the like, configured to enable access to the database for various activities, such as, for uploading new thrombin activity profiles (and, optionally, additional medical information associated therewith), searching, indexing and retrieving.

The database may be used world-wide and may provide resolution to unconventional cases. For example, the database may enable comparing thrombin activity profile from patients receiving new therapies to thrombin activity profile from patients receiving conventional therapies, which may assist in evaluating the effect of the new therapies. The database may further allow to characterize the etiology of atypical clots and hence can assist in customizing specific therapy for preventing secondary ischemic events in patients having the atypical clots.

In some embodiments, the time from said loading until the reaction buffer is discharged from the chromatography apparatus, is the incubation time. In some embodiments, each discharged reaction buffer is collected into a corresponding receptacle configured to receive the discharged reaction buffer. Thus, for a plurality of loading there is a corresponding plurality of receptacles configured to receive the corresponding discharged buffer.

The plurality of receptacle may be a well plate, such as, 6-well plate, 12-well plate, 24-well plate and the like, which can be placed under the chromatography apparatus and move between one incubation to another, such that, the discharged reaction buffer at the end of each incubation period is collected into a new, empty well. The movement of the wells may be automatically operated, and may be coordinated with automatic loading. Thus, the method may be performed automatically.

Determining the level of thrombin may be performed in real time, or at any time after completing the collection of discharged reaction media. Detecting the amount of thrombin substrate, for the purpose of determining the level of thrombin, can be performed by any method and equipment known in the art. For example, determining the level of thrombin may be based on the use of thrombin substrate, wherein when the thrombin substrate includes a fluorophore, detection may be performed by a fluorometer.

In some embodiments, the method further comprises applying a treatment regimen based on thrombus etiology. Thus, in some embodiments, the method further comprises applying a treatment regimen comprising anticoagulants upon determining a reduction in the level of thrombin, aimed to inhibit coagulation factors activity or to inhibit generation thereof. In some embodiments, the method further comprises applying a treatment regimen comprising antiplatelet therapy upon determining an increase, or non-significant changes, in the level of thrombin, aimed to inhibit platelet aggregation through inhibition of either arachidonic acid pathway or ADP (adenosine diphosphate) pathway.

In some embodiments, there is provided at least one anticoagulant for the prevention of recurring secondary ischemic event, following a previous ischemic event originating from atrial fibrillation, wherein the previous ischemic event is defined as originating from atrial fibrillation by temporal reduction of thrombin activity in a thrombus formed during said previous event. In some embodiments, the ischemic event is an ischemic stroke.

In some embodiments, there is provided at least one antiplatelet agent for the prevention of recurring secondary ischemic event, following a previous ischemic event originating from arteriosclerosis, wherein the previous ischemic event is defined as originating from arteriosclerosis by constant or elevated thrombin activity overtime in a thrombus formed during said previous event.

In some embodiments, the anticoagulant therapy comprises oral anticoagulants. In some embodiments, the anticoagulant therapy comprises any one or more of directly acting anticoagulants (DOACs), novel oral anticoagulants (NOACs), and non-vitamin K antagonist oral anticoagulants, including, but not limited to, direct thrombin inhibitors, coumarins, heparin and derivatives thereof, and synthetic pentasaccharide inhibitors of factor Xa.

In some embodiments, the anticoagulant therapy comprises any one or more of warfarin (e.g. Coumadin®), apixaban (e.g. Eliquis®), rivaroxaban (e.g. Xarelto®) and dabigatran (e.g. Pradaxa®).

In some embodiments, the antiplatelet therapy comprises one or more of adenosine diphosphate (ADP) receptor inhibitors, phosphodiesterase inhibitors, adenosine reuptake inhibitors and thromboxane inhibitors. In some embodiments, the antiplatelet therapy comprises one or more of aspirin, clopidogrel (Plavix®), ticagrelor (e.g. Brilinta®) and prasugrel (e.g. Effient®).

In some embodiments, there is provided a method for preventing recurrent ischemic event, the method comprising:
  (a) identifying the origin of a thrombus, said identifying includes:
    incubating a sample of the thrombus in a reaction buffer; and determining the level of thrombin in the reaction buffer at a plurality of time points, thereby identifying the origin of the thrombus; and
  (b) administering to the subject in need thereof a treatment regimen based on the origin of the thrombus.

In some embodiments, the treatment regimen includes anticoagulants upon determining a reduction in the level of thrombin.

In some embodiments, the treatment regimen includes antiplatelet therapy upon determining an increase in the level of thrombin or an unchanged level of thrombin.

The terms 'recurrent' and 'secondary' as used herein are interchangeable, referring to an ischemic event occurring after a previous, or the first (initial), ischemic event.

In some embodiments, said identifying the origin of a thrombus further includes, prior to said incubating, obtaining a thrombus obtained from an ischemic event.

In some embodiments, the thrombus is obtained from a subject in need thereof. In some embodiments, the subject in need thereof is a subject who underwent an ischemic event. In some embodiments, the subject in need thereof is a subject who underwent a primary ischemic event.

In some embodiments, the method comprises adding thrombin substrate to the reaction buffer, prior to said determining. In some embodiments, the method further comprises transferring the sample of thrombus to another (fresh) reaction buffer for further incubation, following said incubating, or following said adding thrombin substrate, or prior to said detecting.

In some embodiments, the method further comprises repeating said incubating in a plurality of reaction buffers for a corresponding plurality of incubation periods, wherein said determining comprises determining the level of thrombin in each of the plurality of reaction buffers, or in at least two of the plurality of reaction buffer. It is noted that in order to determine temporal activity of thrombin, as disclosed herein, it is sufficient to determine thrombin activity in two different reaction buffers corresponding to two different incubation periods.

In some embodiments, there is provided an anticoagulant therapy for preventing recurrent ischemic event(s), upon identification of a previous event as arterial fibrillation by the methods and kits disclosed herein.

In some embodiments, there is provided an anticoagulant for preventive treatment of recurrent ischemic events, upon identification of a previous event as arterial fibrillation by the methods and kits disclosed herein.

In some embodiments, there is provided use of an anticoagulant for preventive treatment of recurrent ischemic event(s), upon identification of a previous event as arterial fibrillation by the methods and kits disclosed herein.

In some embodiments, there is provided an anticoagulant for preventing recurrent ischemic event(s), upon identification of a previous event as arterial fibrillation by the following steps:
(a) incubating a sample of a thrombus obtained from a previous ischemic event in a reaction buffer;
(b) determining the level of thrombin in the reaction buffer at a plurality of time points; and
(c) identifying the origin of the previous event as atrial fibrillation upon determining a reduction in the level of thrombin.

In some embodiments, the method further comprising removing the sample of the thrombus from the reaction buffer prior to step (b). In some embodiments, the method further comprising adding thrombin substrate prior to step (b). In some embodiments, the method further comprising removing the sample of the thrombus from the reaction buffer prior to said adding. In some embodiments, the method further comprising removing the sample of the thrombus from the reaction buffer prior to step (b) or prior to said adding.

It is to be understood that the methods and kits disclosed herein are particularly useful for identifying the unknown etiology of thrombi associated with cryptogenic stroke.

Thus, in some embodiments, there is provided a method for identifying the etiology of a thrombus associated with cryptogenic stroke, the method comprising:
(a) incubating a sample of a thrombus associated with cryptogenic stroke in a reaction buffer;
(b) adding a thrombin substrate to the reaction buffer; and
(c) determining the level of thrombin in the reaction buffer at a plurality of time points, wherein reduction in the level of thrombin indicates that the origin of said thrombus associated with cryptogenic stroke is arterial fibrillation, otherwise the origin of said thrombus associated with cryptogenic stroke is arteriosclerosis.

In some embodiments, there is provided an antiplatelet therapy for preventing recurrent ischemic event upon identification of a previous event as arteriosclerosis by the methods and kits disclosed herein.

In some embodiments, there is provided an antiplatelet preventive treatment for recurrent ischemic event upon identification of a previous event as arteriosclerosis by the methods and kits disclosed herein.

In some embodiments, there is provided an antiplatelet therapy for preventing recurrent ischemic event upon identification of a previous event as arteriosclerosis by the following steps:
(a) incubating a sample of a thrombus obtained from the previous ischemic event in a reaction buffer;
(b) determining the level of thrombin in the reaction buffer at a plurality of time points; and
(c) identifying the origin of the previous event as arteriosclerosis upon determining an increase, or no significant change in the level of thrombin.

In some embodiments, the method further comprising removing the sample of the thrombus from the reaction buffer prior to step (b). In some embodiments, the method further comprising adding thrombin substrate prior to step (b). In some embodiments, the method further comprising removing the sample of the thrombus from the reaction buffer prior to said adding. In some embodiments, the method further comprising removing the sample of the thrombus from the reaction buffer prior to step (b) or prior to said adding.

The terms 'significant' or 'significance' as used herein refer to statistical significance, for example, p-value (probability value)<0.05.

The methods disclosed herein may be performed manually, or automatically, by mechanisms and/or robotics configured for performing the method steps. Following accumulation of thrombin levels over time, the analysis of thrombin temporal profile for the identification of thrombus etiology may be performed manually, by professionals or automatically by computer software which directs a computer processor to generate thrombin temporal pattern and/or to determine, based on thrombin temporal pattern, the etiology of the analyzed thrombi. Etiology determination may be carried out by a computer processor based on a comparison of the acquired data with reference data, such as reference ratio(s).

In some embodiments, a pattern of thrombin level over time may be analyzed using statistical means and computerized algorithm to determine if it represents a pattern of AF or AS. The algorithms may include, but are not limited to, machine learning and pattern recognition algorithms.

Figure 2:
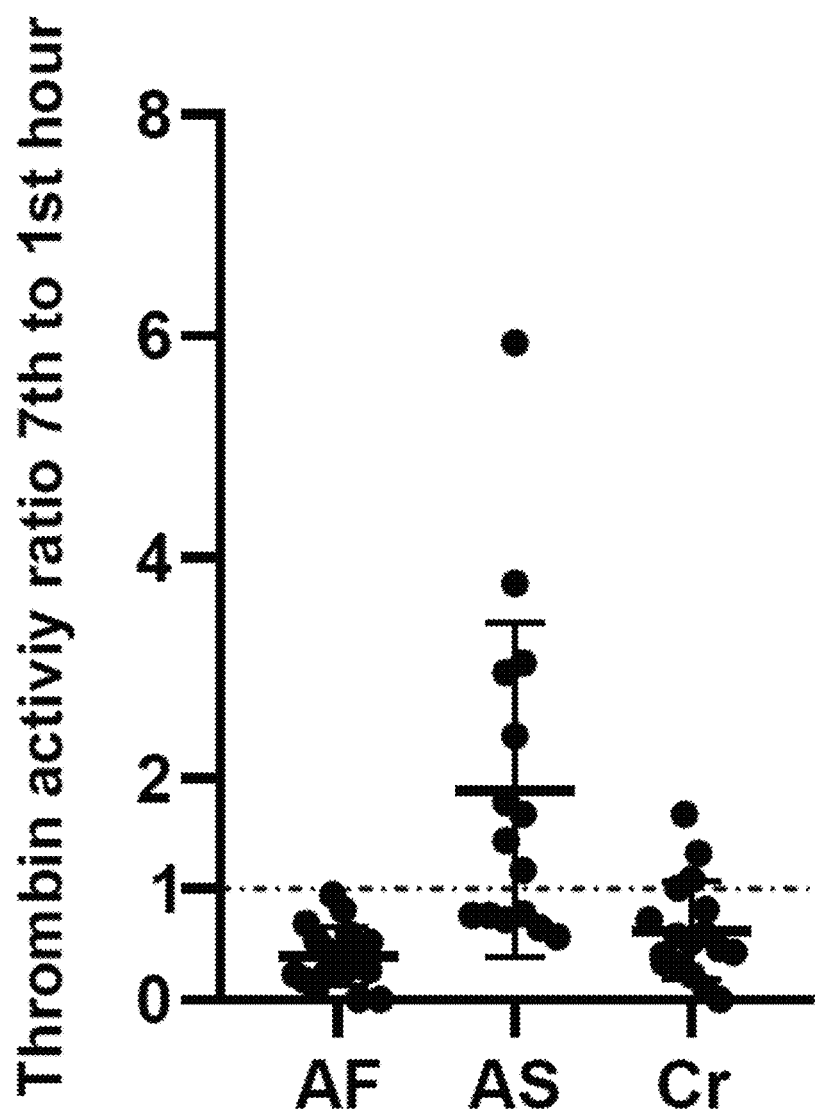
FIG. 2 exhibits dispersion (range bars represent average and standard deviation) of $7^{th}$ to $1^{st}$ hour thrombin activity ratios (indexes) in clots from individual patients categorized as AF, AS and Cr, with dashed threshold value of 1 representing positive decay of thrombin activity (p***, <0.001, One way ANOVA).

In some exemplary embodiments, the determined thrombin levels over time may be calculated into ratios (as shown in Example 1, FIG. 2). The calculated ratios may be compared against a scale of reference ratios generated for this comparison. The scale may exhibit a threshold value or score, also termed hereinafter 'cutoff' or 'pre-defined threshold', above which are reference ratios corresponding to the AS and below are reference ratios corresponding to AF. According to some embodiments, the threshold value is about 1.

In some embodiments, the lower ratios, at the bottom of the scale and/or below a cutoff, may be from thrombi the etiology of which is AF, while the higher ratios at the top of the scale and/or above a predetermined cutoff, may be from thrombi the etiology of which is AS. For each ratio, a score may be given based on its relative position within the scale and/or with respect to the cutoff, where the score may be used for determining the probability of the identification, namely, the probability that the origin of the thrombus is AF (or AS). In some embodiments, a score is a number between 0-100 reflecting the probability that the calculated ratio is AF or AS, wherein 0 being the lowest probability and 100 being the highest probability.

In additional exemplary embodiments, for each calculated ratio, the probability that it represents AF (or AS) may be determined based on comparison to corresponding AF (or AS) reference ratio(s).

In some embodiments, determining the threshold value includes measuring ratios of thrombin levels in thrombi obtained from a large population of subjects following ischemic event originated either from AF or from AS.

In some embodiments, the threshold values are statistically significant values. Statistical significance is often determined by comparing two or more populations, and determining a confidence interval (CI) and/or a p value. In some embodiments, the statistically significant values refer to confidence intervals (CI) of about 90%, 95%, 97.5%, 98%, 99%, 99.5%, 99.9% and 99.99%, while preferred p values are less than about 0.1, 0.05, 0.025, 0.02, 0.01, 0.005, 0.001 or less than 0.0001. Each possibility represents a separate embodiment of the present invention. According to some embodiments, the p-value of the threshold score is at most 0.05.

In some embodiments, the method further comprises generating an artificial clot from a blood sample of the subject from whom the thrombus is obtained, and performing the method steps for identifying thrombus origin on said artificial clot.

Thrombin activity profile of the artificial clot may be used as control reference to the reliability of the method. Specifically, applying the method on clots obtained from a patient that underwent ischemic event and further applying the method on artificial clots generated from the blood of the same patient, allow to have a positive control to the method and/or function as a reference/standard to thrombin activity/level profile obtained from the non-artificial clot, namely, the clot retrieved from the patient following ischemic event. Furthermore, in cases where the patient is under treatment regimen that may affect thrombin activity, the effect on thrombin activity will be reflected on the non-artificial clot and also on the artificial clot, which will allow to deduce with greater confidence that the method is not effective under such treatment regimen and/or that the method should be applied at time points where the level of the medications, used in the treatment regimen, in said patient's blood is low.

As used herein, the term "about", when referring to a measurable value is meant to encompass variations of +/−10%, +/−5%, +/−1%, or +/−0.1% from the specified value.

In some embodiments, there is provided a kit, the kit comprises:
(a) at least one reaction buffer container comprising reaction buffer configured for incubation of a sample of a thrombus;
(b) at least one thrombin substrate container comprising thrombin substrate for monitoring thrombin activity in the reaction buffer; and
(c) instructions for use of the kit for determining thrombus origin, the instructions comprise the following:
  i. incubate a sample of a thrombus in the least one reaction buffer container comprising the reaction buffer;
  ii. add to the at least one reaction buffer container the thrombin substrate from the at least one thrombin substrate container;
  iii. determine the level of thrombin in the reaction buffer at a plurality of time points.

In some embodiments, the kit further comprises a container for generating an artificial clot from a blood sample of the subject from whom the thrombus is obtained. In some embodiments, the kit further comprises a container for generating an artificial clot from a blood sample of the subject from whom the thrombus is obtained and instructions for use, including the instructions to incubate a blood sample drawn from the subject, in the container, at room temperature, until one or more clots are formed. In some embodiments, the instructions for use include the instructions to incubate a blood sample drawn from the subject, in the container, at room temperature, for at least 30 min., at least 60 min, at least 90 min. and at most 250 min.

In some embodiments, the instructions for use further include instructions to perform instructions (i) to (iii) on said artificial clot.

Thrombin activity profile of the artificial clot may be used as control reference to the reliability of the kit. Specifically, failure to obtain thrombin activity profile of a clot obtained in vivo and the artificial clot indicate that the kit is not functioning, or that at least one component of the kit, for example, the thrombin substrate has to be replaced or replenished. Furthermore, in cases where the patient from which the non-artificial clot is obtained, is under treatment regimen that may affect thrombin activity, the effect on thrombin activity will be reflected on the non-artificial clot and also on the artificial clot, which will allow to deduce with greater confidence that the kit is not effective under such treatment regimen and/or that the kit should be used at time points where the level of the medications, used in the treatment regimen, in said patient's blood is low.

In some embodiments, the kit is intended for clinical use, and the artificial clot is obtained by any method known in the art, prior to applying the kit for determining thrombus origin and independently from the contents and instructions of the kit.

In some embodiments, the kit further comprises an artificial thrombus representing a thrombus associated with AF as positive control, such that, incubating the artificial thrombus associated with AF results with a temporal decrease in thrombin.

In some embodiments, the kit further comprises as positive control a container comprising thrombin in an amount corresponding to thrombin ratio associated with AF, i.e., lower or equal to 1, wherein the ratio corresponds to thrombin level after 7 hours incubation with thrombin substrate, relative to thrombin level after 1-hour incubation with thrombin substrate.

In some embodiments, the kit further comprises as positive control a container comprising thrombin in an amount corresponding to thrombin ratio associated with AS, i.e. higher than 1, wherein the ratio corresponds to thrombin level after 7 hours incubation with thrombin substrate, relative to thrombin level after 1-hour incubation with thrombin substrate.

In some embodiments, the kit further comprises as positive control for AF two containers containing thrombin, one designated t0, the other t1, where the level of thrombin in t1 is lower than the level of thrombin in t0.

In some embodiments, the kit further comprises as positive control for AS two containers containing thrombin, one designated t0, the other t1, where the level of thrombin in t1 is higher than the level of thrombin in t0.

In some embodiments, the instructions for use of the kit further include the instructions to apply instructions (i) to (iii) on the positive control, and comparing the determined values obtained for the sample of the thrombus and for the positive control. It is to be understood that the positive control, representing results for AF or AS, is primarily required as a verification to the quality of the assay and/or the quality of the kit components. A user of the kit detecting temporal reduction in thrombin activity for the test sample, may verify the observation by detecting temporal reduction of the positive control for AF. Similarly, a user of the kit detecting temporal increase in thrombin activity for the test sample, or substantially no change in the level of thrombin over time, may verify the observation by detecting similar activity in the positive control for AS.

In some embodiments, the kit comprises a plurality of containers, each comprising reaction buffer configured for incubation of a sample of a thrombus.

In some embodiments, the kit further comprises at least one device for grabbing, otherwise holding, gripping, lifting and holding, picking and holding or the like, a sample of a thrombus, for retaining the sample of the thrombus in each of said plurality of containers each comprising the reaction buffer, and for transferring the sample of the held thrombus from one of said plurality of containers comprising the reaction buffer to another for further incubation.

In some embodiments, the at least one device is selected from tweezers, tongs, moat spoon and the like.

Figure 4A:
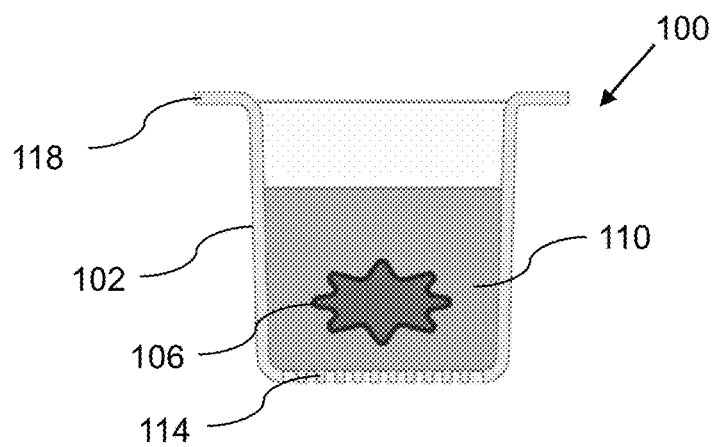
FIGS. 4A and 4B exhibit semi-permeable container configured to fit within a plurality of wells in a 96-well plate.
Figure 4B:
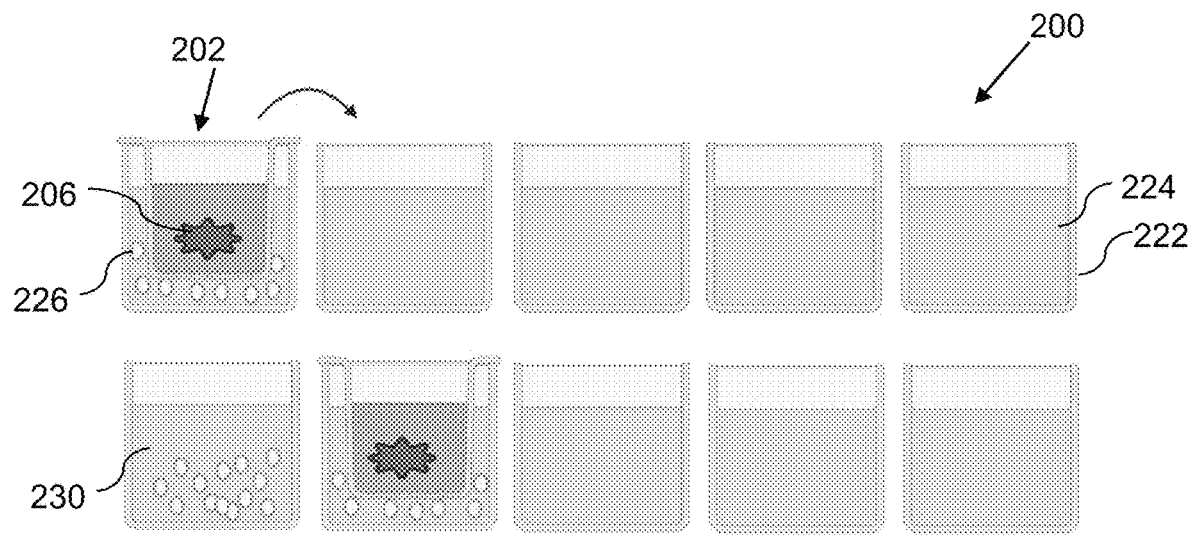

In some alternative embodiments, the kit further comprises a permeable receptacle, such as, permeable receptacle 100 shown in FIG. 4A, adapted for retaining a sample of a thrombus, such as, thrombus 106, during immersion in the reaction buffer and during transferring the sample of the thrombus between one of said plurality of containers, such as, containers 222 (shown in FIG. 4B) to another. In some embodiments, permeable receptacle 100 has at least one permeable wall, such as, permeable wall 114.

In some embodiments, permeable receptacle 100 includes thrombus 106 and reaction buffer 110. In some embodiments, the permeable receptacle 100 further comprises gripping arms 118 adapted for maintaining permeable receptacle 100 movably attached to each of containers 222, while retained therein with thrombus 106 during immersion in the reaction buffer 224 which includes thrombin 226

In some embodiments, reaction buffer 224 in container 222 is a fresh reaction buffer prior to immersion of permeable receptor 100 with thrombus 106 therewithin. After removal of permeable receptor 100 with thrombus 106 from container 222, the reaction buffer remained in container 222 is a used reaction buffer 230, wherein the measure of thrombin activity is performed on used reaction buffer 230.

In some embodiments, the plurality of containers 222 includes a well plate comprising a plurality of well, for example, a 6-well plate, 12-well plate, 18-well plate, 24-well plate, 48-well plate, or a 96-well plate.

In some embodiments, the permeable receptacle includes permeable film, permeable fabric, a net, or a mesh. In some embodiments, permeable wall 114 includes permeable film, permeable fabric, a net, or a mesh.

The term "permeable" as used herein is meant to indicate that the receptacle's permeable wall is permeable to the reaction buffer and to substances secreted by a sample of a thrombus.

In some embodiments, there is provided a method for generating an artificial thrombus, the method comprising incubating a sample of peripheral blood, for 1 to 60 minutes, thereby obtaining a thrombus.

In some embodiments, said incubating is carried out for 5 to 45 minutes or 10 to 30 minutes.

The terms 'artificial thrombus' and 'laboratory-generated thrombus' as used herein are interchangeable.

Figure 5:
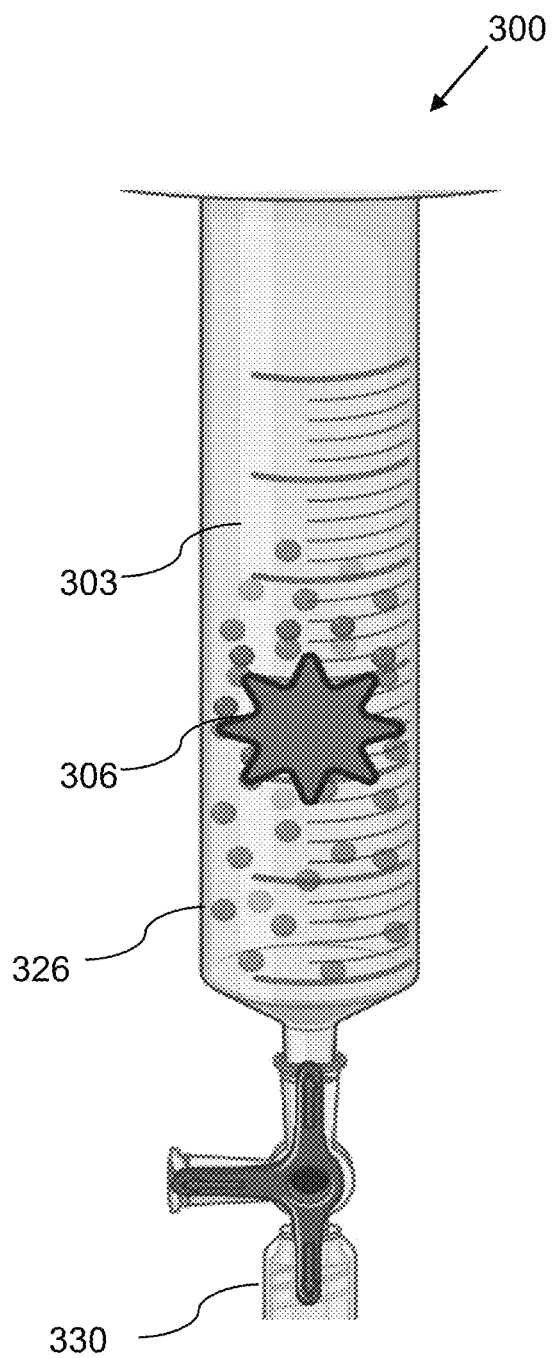
FIG. 5 exhibits a chromatography column having a thrombus immobilized in an inert stationary phase and washed by reaction buffer and the thrombin substrate, according to some embodiments.

In some embodiments, the at least one reaction buffer container comprising the reaction buffer configured for incubation of a sample of a thrombus is a chromatography apparatus, such as, column 300, shown in FIG. 5. In some embodiments, column 300 includes an inert stationary phase 303 configured to maintain a thrombus 306 therewithin. In some embodiments, inert stationary phase 303 is configured to maintain thrombus 306 immobilized therewithin.

The term 'immobilized' as used herein refers to the fact that during loading of reaction buffer into column 300 and as the reaction buffer washes through column 300, thrombus 306 remains within column 300 and is not washed out.

In some embodiments, column 300 further includes a mobile phase (not shown) wherein the mobile phase comprises the reaction buffer. In some embodiments, the kit further comprises a plurality of collecting receptacles, adapted to collect discharged used reaction buffer 330 at various time points, wherein for determining thrombin activity, thrombin substrate is added to each of the plurality of collecting receptacles, prior to said determining.

In some embodiments, column 300 further includes a mobile phase (not shown) wherein the mobile phase comprises the reaction buffer and a thrombin substrate. In some embodiments, the kit is configured for detection in situ. Specifically, the kit may be associated with detection means, adapted to detect thrombin activity within the mobile phase of the column.

Thus, in some embodiments, there is provided a system comprising a chromatography apparatus configured to hold within a stationary phase thereof a sample of a thrombus; at least one reaction buffer container comprising reaction buffer configured for use as a mobile phase of the chromatography apparatus; at least one thrombin substrate container comprising thrombin substrate for monitoring thrombin activity in the reaction buffer; detection means configured to detect thrombin activity in the chromatography apparatus when operating; and instructions for use.

In some embodiments, the thrombin substrate comprises a fluorescent marker and the detection apparatus is a fluorescence detector.

In some embodiments, the chromatography apparatus may be of any configuration suitable for operating the assay. In some embodiments, the chromatography apparatus is a chromatography column. In some embodiments, the chromatography apparatus is a plane. However, any other configuration and structure may apply. For example, the chromatography apparatus may be a column positioned in parallel or perpendicularly or in any suitable position with respect to a plane, e.g. the plane of surgery room floor.

When the chromatography apparatus is in the form of a column, such as column 300, then during operation of column 300 fresh reaction buffer which includes thrombin substrate may be loaded on one end (e.g. top end, as shown in FIG. 5) of column 300, and a used reaction buffer 330 may be discharged from the other end (bottom) of column 300, wherein detecting the amount of thrombin substrate, for the purpose of determining the level of thrombin, is performed on discharged used reaction buffer 330. In some embodiments, column 300 is associated with detection means. The detection means may include a detector, such as, a spectrophotometer, e.g. fluorometer (or fluorimeter). The detector may be linked to a controller configured to determine the level of thrombin in the reaction buffer discharged from the column, continuously, or at predetermined time points. The controller may be a processor or any other suitable computing means, which includes or operates algorithm(s).

In some embodiments, the kit further comprises at least one collecting receptacles, adapted to collect discharged used reaction buffer 330 at various time points. In some embodiments, the kit further comprises a plurality of collecting receptacles, adapted to collect discharged used reaction buffer 330 at various time points. In some embodiments, plurality of collecting receptacles includes a well plate comprising a plurality of well, for example, a 96-well plate.

In some embodiments, there is provided a system for identifying thrombus origin, the system comprising: a kit for identifying thrombus origin, as disclosed herein; detection apparatus configured to detect thrombin activity over time during, or following, incubation of a thrombus in a reaction buffer, or in a plurality of reaction buffers according to the contents and instructions for use of the kit; and a database configured to dynamically accumulate thrombin activity data, collected by the kit, and optionally, medical information.

In some embodiments, the database is installed on a server. In some embodiments, the server is within a cloud-based computing environment. In some embodiments, the server is tangible. In some embodiments, the tangible server is selected from the group consisting of a computing device, such as a computer's hard drive, a removable device, such as, an external hard drive or universal serial bus (USB) flash drive.

Thus, in some embodiments, the system for identifying thrombus origin further includes a server containing the database and a processing unit. The processing unit is adapted to enable access to the database, to dynamically modify the database by adding new data, executing calculations (such as determining thrombin level based on detected thrombin substrate), performing statistical analyses, and searching thrombin activity profile (thrombin temporal activity) according to various indices (e.g. age, gender, ethnicity and medical history) among other functions which can be added and modified, as required.

In some embodiments, there is provided a computer implement-method for identifying thrombus origin, the method comprising the steps of:
 (a) providing a system for identifying thrombus origin;
 (b) incubating a sample of a thrombus in a reaction buffer;
 (c) determining the level of thrombin in the reaction buffer at a plurality of time points;
 (d) uploading said level of thrombin in the reaction buffer at the plurality of time point onto the server, thereby identifying the origin of the thrombus wherein the system comprises a server configured for storing data, and a processing unit configured to determine thrombin level. In some embodiments, the server comprises a database containing a plurality of thrombin temporal activity profiles and corresponding thrombus origin. In some embodiments, the database further comprises medical data associated with thrombin temporal activity. In some embodiments, the database further comprise medical information associated with thrombin temporal activity. In some embodiments, the processing unit is adapted to enable any one more of: accessing the database, dynamically modifying the database by adding new data, executing calculations (such as determining thrombin level based on detected thrombin substrate), performing statistical analyses, and searching thrombin activity profile according to various indices (e.g. age, gender, ethnicity and medical history) among other functions which can be added and modified, as required.

In some embodiments, the computer implement-method further comprises adding thrombin substrate to the reaction medium prior to said determining. In some embodiments, the computer implement-method further comprises detecting the amount of thrombin substrate at the plurality of time points, uploading the detected amounts onto the server, wherein the server includes an algorithm configured to determine the level of thrombin based on said detected amounts.

In some embodiments, the system and the computer implement-method are adapted for operating in a surgery room. In some embodiments, the system is adapted for operating during surgery which involves thrombus removal. In some embodiments, the system and the computer implement-method are adapted to provide statistical analyses soon after thrombus is removed and analyzed, namely, within a few minutes (e.g. about 10 minutes, about 15 minutes, or about 20 minutes) from incubating a thrombus, or fragment(s) thereof in reaction medium.

One skilled in the art readily appreciates that the present invention is well adapted to carry out the objects and obtain the ends and advantages mentioned, as well as those inherent therein. The examples provided herein are representative of preferred embodiments, are exemplary, and are not intended as limitations on the scope of the invention.

EXAMPLES

Example 1: Clinical Study for Identifying Stroke Etiology

An integrated clinical non-interventional prospective study was conducted in a controlled laboratory setting.

The study included 68 participants, Median patients' age was 69 years (mean 72, ±12) with 57% males, applying the following criteria:
 Criteria of inclusion: All ischemic stroke patients above 18 years of age, presenting with large vessel occlusion that were eligible and underwent acute endovascular stroke treatment by mechanical thrombectomy according to accepted clinical and imaging criteria;
 Criteria of exclusion: Patients that could not undergo acute stroke endovascular thrombectomy and patients/families that did not consent to participate in the study.

Mechanical thrombectomy was performed during angiography for acute ischemic stroke intervention. To this end, a femoral artery sheath was inserted, a guiding catheter was placed in the carotid or vertebral artery and a micro catheter was delivered beyond the occlusion. A thrombectomy stent retriever device was used for thrombectomy. Retrieved thrombus/thrombi were collected and immediately frozen in −80° C. It should be mentioned that in each and every case, thrombectomy catheterization system was washed constantly by heparinized solution, with low heparin concentration (2 IU/ml), though heparin was not expected to have a differential effect on specific samples since the same procedure was conducted on all patients.

Clinically based stroke etiology for each participating patient was determined independently by senior vascular neurologists based on all diagnostic and clinical information available, including available imaging studies such as Computed Tomography (CT, CTA, CT perfusion), angiography or MRI, duplex sonography, coagulation profile, short or long-term electrocardiography (ECG) recording and echocardiographic workup. All the patients underwent transthoracic echocardiogram, and selected patients—based on clinical suspicion—underwent transesophageal echocardiogram (such as suspected valvular vegetations, patent foramen ovale, cryptogenic strokes, in patients under the age of 60). All the patients underwent baseline ECG in order to rule out unknown occult atrial fibrillation. All the patients with sinus rhythm on baseline ECG on admission and without history of paroxysmal atrial fibrillation went through a mandatory 24 hours Holter cardiac rhythm monitoring. Selected patients underwent 48 Holter monitoring and/or 30 days event loop recorder, in an ambulatory setting.

Since the study examined a novel thrombus categorization in acute ischemic stroke a TOAST criteria for acute ischemic stroke etiology could not be applied. Instead the retrieved clots were categorized into the following five (5) different groups:

1. Atherosclerosis related clots (AS)—retrieved from patients with large vessel occlusion, with severe atherosclerosis of the occluded site per CTA or angiography, that in most cases required emergent stenting or angioplasty.
2. Atrial fibrillation related clots (AF)—retrieved from patients with large vessel occlusion, without severe atherosclerosis per CTA or angiography, that in no case required emergent stenting or angioplasty. Additionally, the patients presented with a history of atrial fibrillation or a new atrial fibrillation was diagnosed during hospitalization workup. In cases of concurrent anticoagulation therapy—only patients with proven non-adherence to treatment according to laboratory results (INR<1.2 or undetectable NOAC levels) or confirmed cessation of therapy>24 hours were included in this group.
3. Cryptogenic clots (Cr)—retrieved from patients with large vessel occlusion, without severe atherosclerosis per CTA or angiography, which in no case required emergent stenting or angioplasty, and without history of atrial fibrillation, with normal sinus rhythm on presentation and on 24 hours Holter monitoring during hospitalization. In no case did an extensive cardiological or hematological workup proved a cardioembolic source.
4. Complex Cardioembolic clots (Cx)—retrieved from patients with large vessel occlusion, without severe atherosclerosis per CTA or angiography, which in no case required emergent stenting or angioplasty. With proven cardioembolic source on presentation or workup, excluding atrial fibrillation.
5. Anticoagulated Atrial Fibrillation clots—as in AF group, but on concurrent anticoagulation therapy with adequate INR levels (including INR>1.1 and/or detectable NOAC levels and/or unknown timing of last dose of anticoagulant). The rationale of this stratification was due to the fact that the biochemical assay utilized in the study is based on coagulation factor activity measurement which could be affected by anticoagulants.

For the thrombin activity assay thrombus after endovascular intervention were maintained in −80° C. For initiating the analysis, frozen thrombi were thawed in room temperature. Each thrombus was divided to equal sized particles which were placed in a tube containing 1 ml of thrombin activity buffer (also termed herein "reaction buffer") having 1 mg/ml bovine serum albumin and calcium (mM quantities), for an hour and then moved to another tube of the same buffer while the former test tube was immediately stored in −80° C., until the detection/determination step, while a subsequent tube containing the thrombus was placed in 37° C. in a fresh reaction buffer. This procedure was repeated hourly for 8 hours.

Thrombin activity was measured as previously described by Beilin et al., (2001, Neuroreport: doi:10.1097/00001756-200108080-00013) in 10 L triplicates of clot-free buffer in a black Nunc 96 wells microplate by a fluorometric assay quantifying the cleavage of the synthetic peptide thrombin substrate Boc-Asp(OBzl)-Pro-Arg-AMC (I-1560, Bachem, Switzerland, 13 µM final concentration). Measurements were performed by the Infinite 2000 microplate reader (Tecan, infinite 200, Switzerland) with excitation and emission filters of 360±35 and 460±35 nm, respectively. For calibration, known concentrations of bovine thrombin (Sigma-Aldrich, Israel) were used in the same assay. In order to verify the specificity of measured fluorescent signal a highly specific thrombin inhibitor NAPAP (Sigma, 1 µM final concentration) was added to selected reaction wells which showed a high and consistent abolition of thrombin activity profile in 15 clots from randomized sources, thus supporting the specificity of the assay. The assay was validated internally repeated clot analyses with excellent reproducibility pattern. The assay was performed in a blinded manner with clots assayed sequentially and the correlation of thrombin activity to stroke etiology made post-hoc. Protein levels were measured by the Bicinchoninic Acid (BCA) method and thrombin activity expressed relative to total secreted protein levels. Specifically, protein concentration in each sample was determined through a BCA assay for the purpose of normalization of thrombin activity levels to total protein concentration in each sample Patients' characteristics, demographical and clinical data, time from symptoms onset to clot retrieval, suspected or confirmed stroke etiology, and thrombus thrombin activity characteristics in each patient are presented in Tables 1A-1E (FIG. 6).

Thrombin levels in the samples were normalized to total secreted protein levels in the medium and expressed as mU thrombin activity/µg protein. Statistical comparisons between the atrial fibrillation/cardio embolic stroke sub-type and atherosclerotic stroke subtype were calculated using unpaired Student's t-test, One-way ANOVA and ANOVA with repeated measures. Cutoff for statistical significance was set up at $p<0.05$. Further, the $R^2$ and Pearson correlation coefficient were calculated to establish a possible correlation between thrombin activity and the incubation time of each sample. Accuracy analysis 95% confidence intervals were based on Clopper-Pearson method. The analyses were performed using Excel Statistical functions (Microsoft Corporation) and GraphPad Prism® software (San Diego, California).

As explained above, the obtained thrombi were stratified into 5 different groups according to thrombus origin etiology where the AF group included 18 patients, the AS group 15 patients, the Cr group 17 patients, the Cx group 8 patients and the Anticoagulated AF group included 10 patients. The groups were similar in their demographic and clinical characteristics, including time to endovascular therapy or occlusion site, prevalence of hypertension, diabetes or dyslipidemia. The only demographic measure that was found to be significant was an older mean age in Anticoagulated AF group (mean 81±7.8 vs. mean 72±12 in the overall cohort, p=0.001, one-way ANOVA). Atherosclerosis related cases did exhibit a higher proportion of active smoking (47% vs. 19% in overall cohort, non-significant, chi-square test). It is interesting to note that the prevalence of congestive heart failure was more prevalent in AF and Anticoagulated AF group (27.8% and 40% respectively vs. 19% in overall cohort, non-significant, chi-square test). However, thrombin activity patterns were not affected by an occlusion site or time to endovascular treatment, neither by demographic nor clinical variables as indicated by multivariate analysis of the data.

The average temporal thrombin secretion levels, per hour, from all groups of patients are presented in FIGS. 1A-1D. As can be seen, the pattern in the AF group showed a continuous reduction in the level of secreted thrombin (0.5-1.5 mU/µg protein) with the most pronounced drop between the first and the second hour (negative slope, p=0.005, $R^2$=0.83, CI −0.216 to −0.667, FIG. 1C—solid squares). In contrast, in the AS group the initial levels of secreted thrombin were similar (1-2 mU/µg protein) to AF group but displayed a trend to increase with time (positive slope, p=0.024, $R^2$=0.67, CI 0.022 to 0.2, FIG. 1C—solid circles). The secretion patterns of these two groups differed significantly, based on one-way ANOVA with repeated measures analysis which showed a significant interaction of thrombin activity with time between groups (p<0.0001). In the Cr group thrombin secretion was similar to the AF group (p=0.99 for the interaction of secretion with time, ANOVA with repeated measures, not shown on graph) and different from the AS group (p=0.017 for the interaction of secretion with time, ANOVA with repeated measures, FIG. 1D).

The Cx group was highly heterogeneous and patients' subgroups were therefore analyzed separately. A focused differentiation between specific patients reveals interesting trends. Two (2) patients with proven valvular vegetations (either cryptogenic or infectious) showed thrombin activity trend resembling AS group, and while one oncologic patient did not show detectable thrombin activity, another oncologic patient had shown pattern resembling AF pattern. In patients with other cardioembolic etiologies, a patent foramen ovale related clot had an AF pattern while a congestive heart failure related clot had shown a pattern resembling AS (Table 1D).

The Anticoagulated AF patients were not analyzed as a group due to the differential effect of concurrent anticoagulant therapy on thrombin activity. Although in most cases thrombin activity was inhibited, no clear association between drug level or type and thrombin secretion patterns was found (Table 1E).

An exemplary simple index describing the time dependent thrombin secretion was obtained by calculating the ratios of $7^{th}$ to $1^{st}$ hour of thrombin activity (FIG. 2 and Table 2).

TABLE 2

| | Statistical data | |
|---|---|---|
| | Value (%) | CI (%) |
| Sensitivity | 100 | 81.47-100 |
| Specificity | 73 | 44.9-92.2 |
| PPV | 82 | 66.04-91.24 |
| NPV | 100 | NA |
| Accuracy | 88 | 71.8-96.6 |

A highly significant difference of activity index was found between AF and Cr groups (FIG. 2, p<0.0005). A cutoff of thrombin activity index that differentiates AF vs. AS related clots was set to value of 1.00 (FIG. 2, dashed line) reflecting increase or decrease secreted thrombin levels with time. Sensitivity, specificity, positive predictive value (PPV) and negative predictive value (NPV) of the assay were calculated according to this cutoff value (Table 2). True positive AF patients were considered those ranging below the cutoff (18/18 in AF group). True negatives were found only in AS group (9/15). Therefore, sensitivity and specificity of AF determination were 100% and 73%, respectively (Table 2, 95% confidence intervals based on Clopper-Pearson method).

Histological analysis of retrieved clots from representative patients was conducted and revealed no origin specific staining pattern in approximately 20 clots that represented all included etiological groups (results not shown).

Example 2: Laboratory Generated (Artificial) Thrombi

For preparing artificial clots, venous blood was obtained from 6 healthy volunteers (males and females; age range 32-62 years; weight range 50-80 kg). Two different artificial clot types were created, with three clot replicates formed for each type, based on Duffy et al. (J Neurointerv Surg., 2017, doi:10.1136/neurintsurg-2016-012308) with some modifications. For the RBCs-rich clot, blood was formed in a static environment. Spontaneous coagulation was initiated by collecting whole blood into an Eppendorf® tube, left stationary for approximately 2-4 h at room temperature (RT).

For the platelets and fibrin-rich clot, blood was anticoagulated in 3.2% sodium citrate solution in a 9:1 ratio. To separate the plasma containing platelets and fibrin, centrifugation was performed (180 g for 10 min at RT). The supernatant contained the platelets-rich plasma (PRP) was gently aspirated to a clean Eppendorf tube and the vacutainer tube was centrifuged again at 350 g (for 10 min at RT). The supernatant was gently aspirated and was added to the collecting Eppendorf® tube. Coagulation was generally initiated following addition of 150 mM calcium chloride solution to the collected PRP supernatants in a 1:9 ratio. Clotted material was allowed to mature for approximately 1 h at RT.

Artificial clots were subjected to analogical incubation procedures similar to the procedure applied on non-artificial clots, as described above. However, each incubation phase was 10 minutes long, where six incubation period were applied.

Figure 3A:
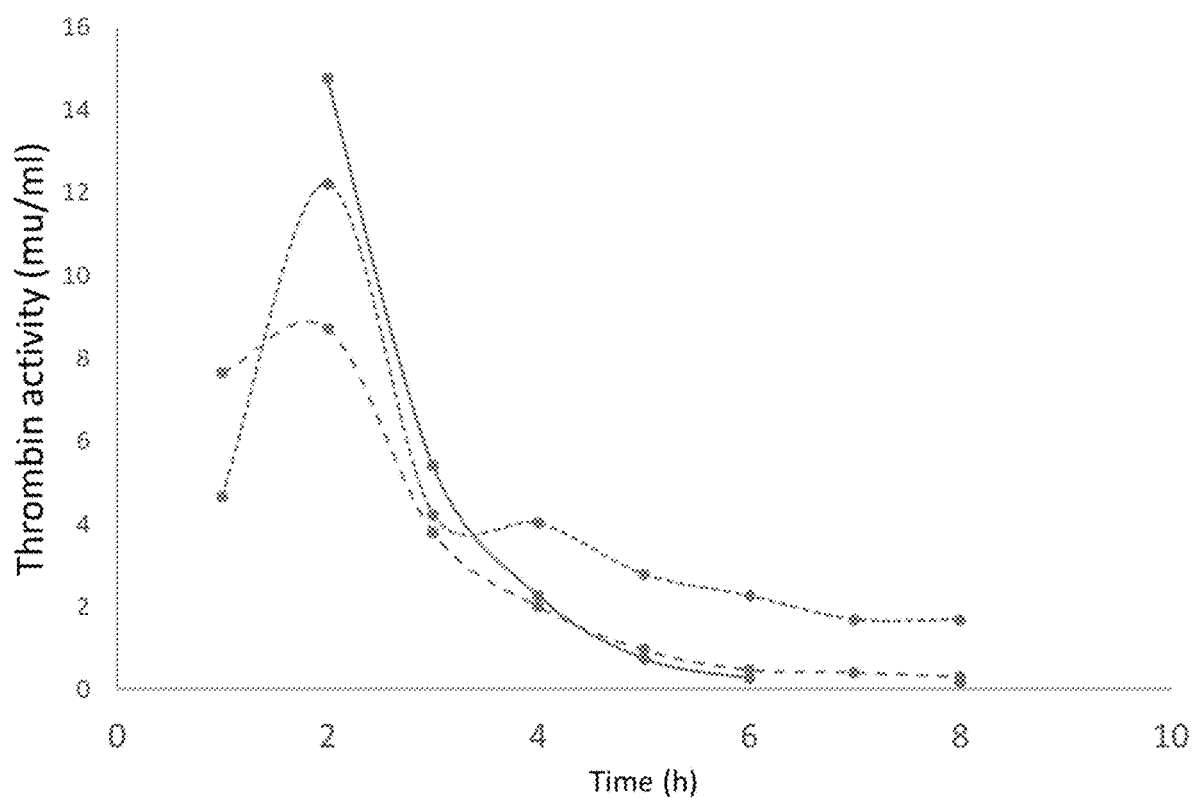
FIG. 3A exhibits thrombin activity in three laboratory-made thrombi, represented by 3 distinct lines (solid, broken and dotted).

FIG. 3A represents thrombin activity of three laboratory-generated thrombi, created from respective blood samples of 3 different patients, following incubation with thrombin substrate after different periods (up to 7 hours) of incubation in a reaction buffer.

Figure 3B:
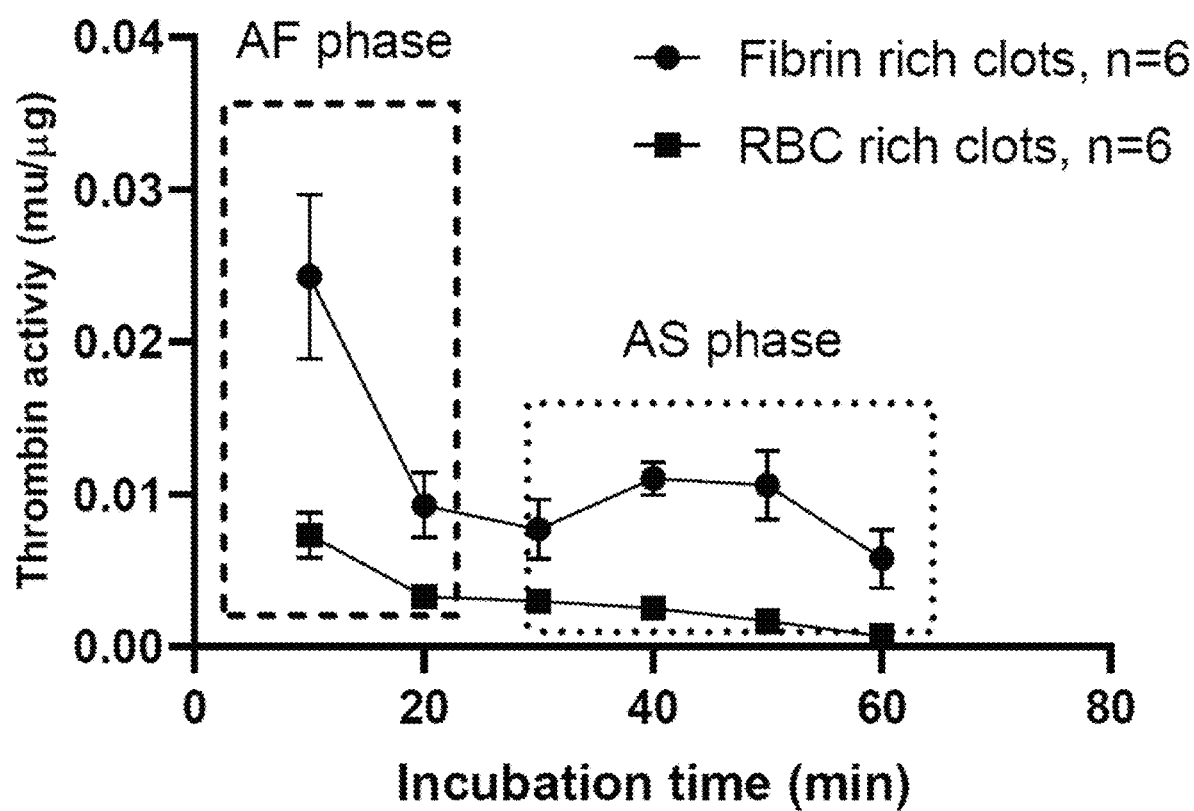
FIG. 3B exhibits average thrombin secretion (activity) in artificial fibrin rich (n=6) and RBC rich (n=6) clots (solid circles and solid squares, respectively).

Average thrombin activity in artificial clots (n=12) had essentially a similar pattern in both RBC and fibrin clots, with two activity phases—first of peak thrombin activity which rapidly declined and then a second constant secretion phase, as shown in FIG. 3B. These results suggest that clot composition has a little effect on thrombin secretion pattern, while suggesting that it is mainly affected by an external washout. According to the activity patterns, the first phase was designated AF-like phase and the second phase AS-like phase.

Figure 1C:
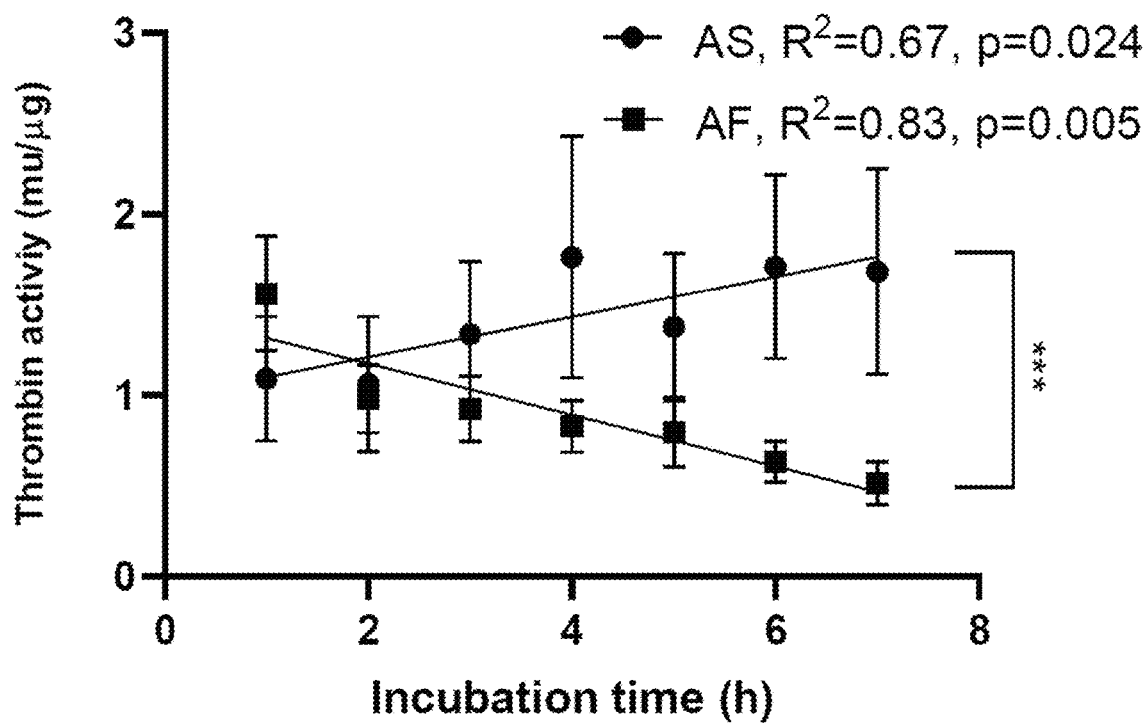
FIG. 1C exhibits regression analysis of thrombin activity plotted over 8 hours incubation of thrombi obtained from patients diagnosed with AF and AS (solid squares and solid circles, respectively; ***-p<0.0001).
Figure 1D:
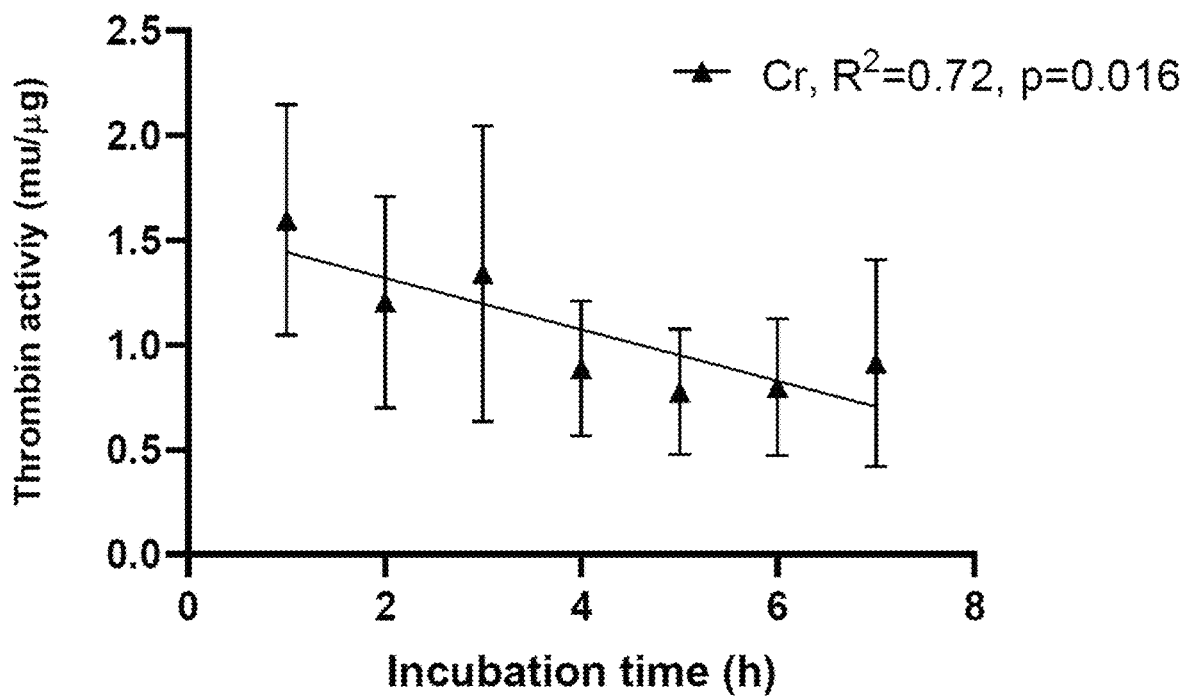
FIG. 1D exhibits regression analysis of thrombin activity plotted over 8 hours incubation of thrombi obtained from patients diagnosed with cryptogenic stroke (Cr).
Figure 3C:
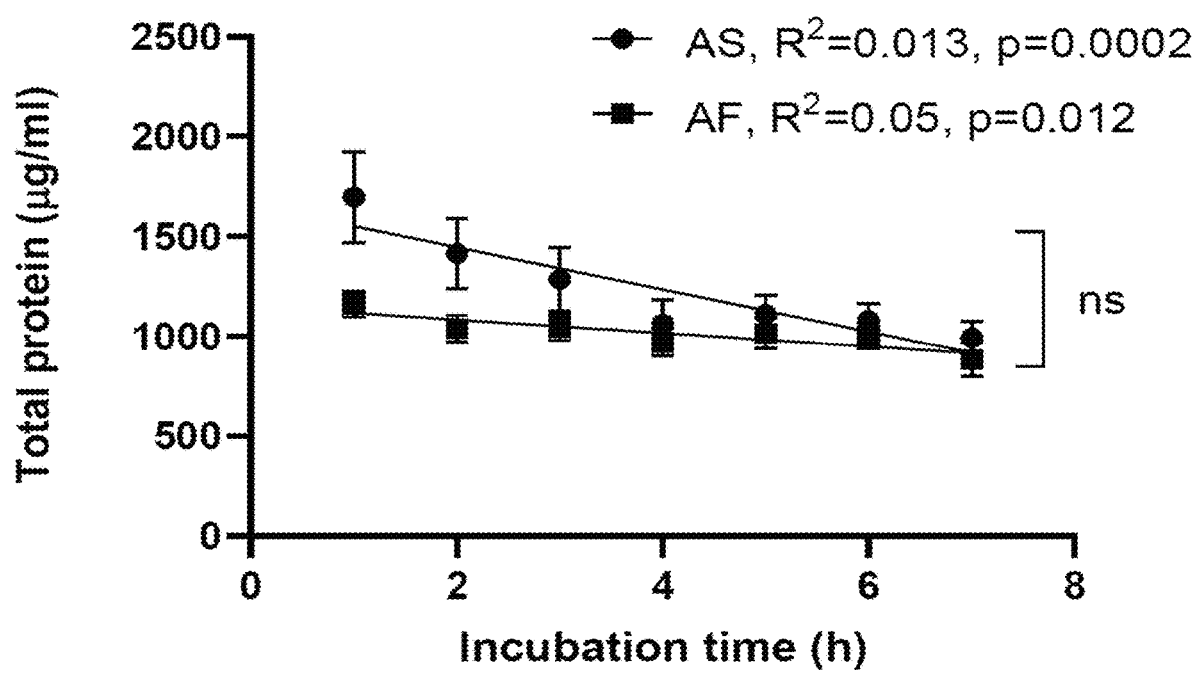
FIG. 3C exhibits average total protein levels in AS and AF clots, following incubations and washings over time.
Figure 3D:
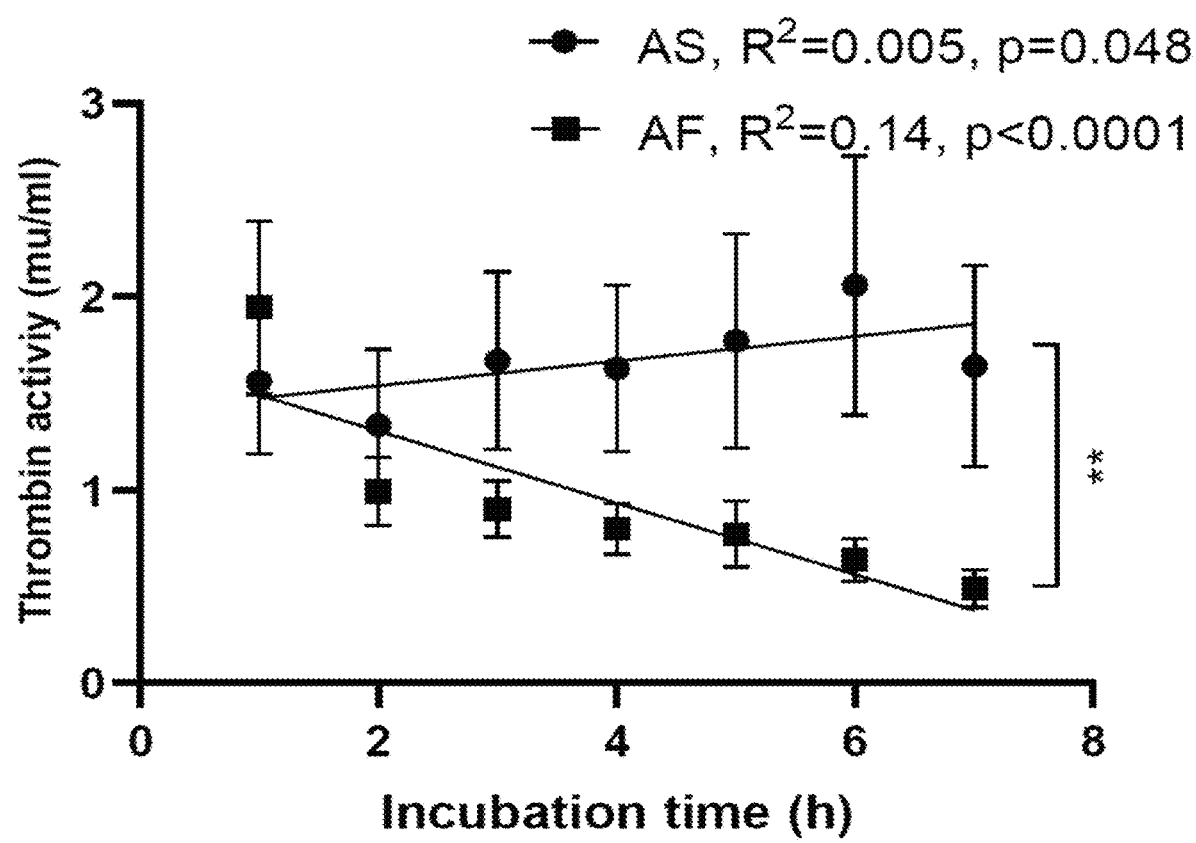
FIG. 3D exhibits average thrombin secretion (activity) corrected to total protein levels, in AS and AF clots, following incubations and washings over time (**-p=0.0002).

In order to examine whether protein contents changes during incubation/washing cycles, and hence may have an effect on the observed temporal activity of clots from different origins, total protein level was evaluated in non-artificial AS and AF clots over incubation/washing cycles, similar to those applied for evaluating thrombin temporal activity (FIG. 3C). The results indicate that in clots generated in-vivo (non-artificial clots) total protein secretion does not differ between AS and AF thrombi, and accordingly, non-significant changes in protein level does not affect the observed thrombin secretion pattern in these two major etiological groups. To confirm this conclusion the pattern of temporal thrombin activity corrected for total proteins for AF and AS clots (FIG. 3D) was compared to a corresponding pattern in non-corrected data (FIG. 1C). FIG. 3D (thrombin activity corrected to total protein level) exhibits similar thrombin activity patterns for AF and AS, to those shown in FIG. 1C, with similar significant interaction of thrombin levels over time (FIG. 3D ANOVA with repeated measures analysis, p=0.0002, **). Thus, the observed differences in thrombin activity pattern cannot be attributed to protein washout over time.

Example 3: Clinical Study—Acute Ischemic Leg

Figure 7:
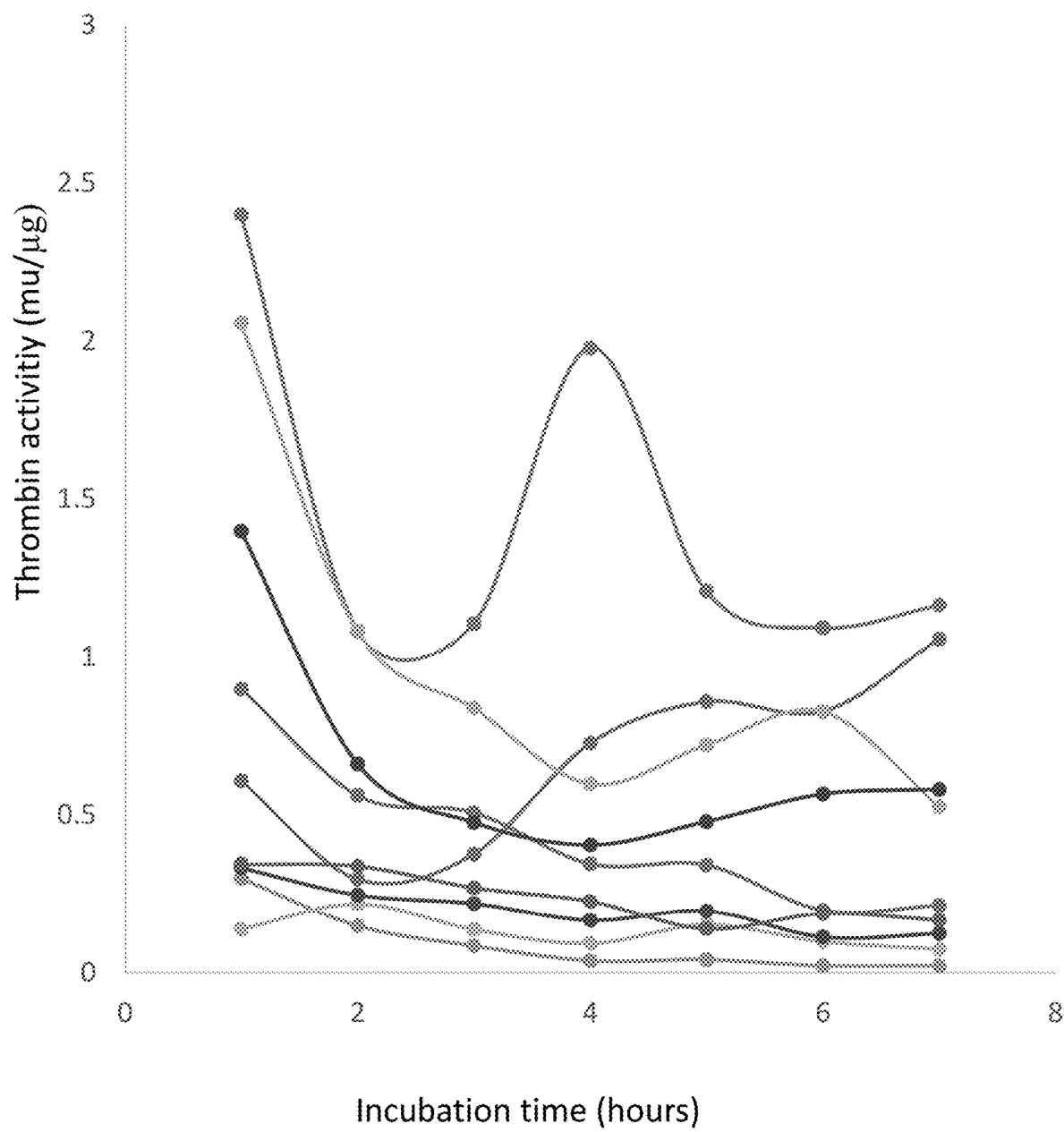
FIG. 7 exhibits thrombin activity pattern over time in thrombi removed from the legs of nine (9) patients.

Thrombin activity pattern over time was determined in thrombi removed from the legs of nine (9) patients (FIG. 7). Thrombin activity was determined by the method described herein. The preliminary data seems to indicate non-uniform profile suggesting different thrombi origin/etiology.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. No feature described in the context of an embodiment is to be considered an essential feature of that embodiment, unless explicitly specified as such.

Although stages of methods according to some embodiments may be described in a specific sequence, methods of the disclosure may include some or all of the described stages carried out in a different order. A method of the disclosure may include a few of the stages described or all of the stages described. No particular stage in a disclosed method is to be considered an essential stage of that method, unless explicitly specified as such.

Although the disclosure is described in conjunction with specific embodiments thereof, it is evident that numerous alternatives, modifications, and variations that are apparent to those skilled in the art may exist. Accordingly, the disclosure embraces all such alternatives, modifications and variations that fall within the scope of the appended claims. It is to be understood that the disclosure is not necessarily limited in its application to the details of construction and the arrangement of the components and/or methods set forth herein. Other embodiments may be practiced, and an embodiment may be carried out in various ways.

The phraseology and terminology employed herein are for descriptive purpose and should not be regarded as limiting. Citation or identification of any reference in this application shall not be construed as an admission that such reference is available as prior art to the disclosure. Section headings are used herein to ease understanding of the specification and should not be construed as necessarily limiting.

While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

The invention claimed is:

1. A method for identifying thrombus origin, the method comprising
   (a) incubating a sample of a thrombus in a reaction buffer; and
   (b) determining the level of thrombin in the reaction buffer at a plurality of time points;
   wherein the thrombus is a thrombus obtained from a subject following ischemic event, and
   wherein the method further comprises adding a thrombin substrate to the reaction buffer prior to said determining and/or
   further comprising removing the sample of the thrombus from the reaction buffer prior to step (b) or prior to said adding.

2. The method of claim 1, wherein reduction in the level of thrombin between an initial time and a later time point indicates that the origin of said thrombus is atrial fibrillation.

3. The method of claim 1, wherein increased or unchanged level of thrombin between an initial time and a later time point indicates that the origin of said thrombus is atherosclerosis.

4. The method of claim 1, wherein said incubating comprises a plurality of incubation periods, and wherein the method further comprises replacing the reaction buffer with a fresh reaction buffer at the conclusion of each incubation period.

5. The method of claim 4, wherein each incubation period is carried out in a respective reaction buffer, and wherein reduction in the level of thrombin detected in a reaction buffer from an early incubation period relative to the level of thrombin determined in a reaction buffer from a later incubation period indicates that the origin said thrombus is atrial fibrillation otherwise the origin of said thrombus is atherosclerosis.

6. The method of claim 1, further comprising removing the sample of the thrombus from the reaction buffer prior to said determining.

7. The method of claim 1, wherein the thrombin substrate comprises a detectable marker.

8. The method of claim 2, further comprising applying a treatment regimen comprising anticoagulants upon determining a reduction in the level of thrombin between an initial time and a later time point.

9. The method of claim 3, further comprising applying a treatment regimen comprising antiplatelet therapy.

* * * * *